United States Patent
Higuchi

(12) United States Patent (10) Patent No.: US 6,324,011 B1
(45) Date of Patent: Nov. 27, 2001

(54) REFLECTION PLATE HAVING DIRECTIVITY AND A DISPLAY APPARATUS USING THE SAME

(75) Inventor: Masaru Higuchi, Hachioji (JP)

(73) Assignee: Casio Computer Co., Ltd., Tokyo (JP)

( * ) Notice: Subject to any disclaimer, the term of this patent is extended or adjusted under 35 U.S.C. 154(b) by 0 days.

(21) Appl. No.: 09/206,546

(22) Filed: Dec. 7, 1998

(30) Foreign Application Priority Data

Dec. 11, 1997 (JP) .................................................. 9-341436
Dec. 25, 1997 (JP) .................................................. 9-358414
Apr. 6, 1998 (JP) .................................................. 10-093135

(51) Int. Cl.[7] ............................ G02B 27/10; G03B 21/60
(52) U.S. Cl. ........................................... 359/627; 359/454
(58) Field of Search ................................... 359/627, 455, 359/457, 742, 454; 349/113

(56) References Cited

U.S. PATENT DOCUMENTS 3,951,129 * 4/1976 Brantley, Jr. ........................... 126/270
6,031,664 * 2/2000 Goto ....................................... 359/456

FOREIGN PATENT DOCUMENTS 11-174214-A * 11/1999 (JP) .................................. G02B/5/08
7-333606-A * 7/1995 (JP) .............................. G02F/1/1335

* cited by examiner

Primary Examiner—Ricky Mack
(74) Attorney, Agent, or Firm—Frishauf, Holtz, Goodman, Langer & Chick, P.C.

(57) ABSTRACT

A reflection plate is provided which includes a reflection film having a flat reflection surface, and an optical film provided thereon. The optical film serves to converge and emit light which has entered therein, in a direction toward an observer. The optical film has first optical interfaces, which are provided to be inclined to a first direction with respect to a normal line of the reflection surface and to reflect or refract entering light, and second optical interfaces, which are provided to be inclined in a direction opposite to the first direction and to reflect or refract entering light. In addition, the optical film has an emission surface from which reflection light from the reflection surface and reflection light and/or refraction light from the first and second optical interfaces are emitted. A groove having a triangular cross-section is formed in the back surface side defined by the first and second optical interfaces. A liquid crystal display element is further provided on the reflection plate, thus constructing a liquid crystal display apparatus.

11 Claims, 11 Drawing Sheets

REFLECTION PLATE HAVING DIRECTIVITY AND A DISPLAY APPARATUS USING THE SAME

BACKGROUND OF THE INVENTION

The present invention relates to a reflection plate having directivity and a display apparatus using the same.

Conventionally, a reflection type display apparatus uses light taken in from external light as illumination light for a display panel and comprises a transmission type display panel 81 such as a liquid crystal display unit or the like which performs display by controlling transmission of light, and a diffusion reflection plate 82 opposed to the back surface of the display panel 81, as shown in FIG. 21.

In this reflection type display apparatus, external light such as natural light or room light entering from the front side of the display panel 81 is reflected by the diffusion reflection plate 82 and reflection light therefrom is used to illuminate the display panel 81 from its back side thereby to perform display. The external light entering from the front side is transmitted through the display panel 81 and is reflected by the diffusion reflection plate 82, as indicated by an arrow in the figure. The light thus diffused within a wide range enters into the display panel 81 from its back surface and is emitted to the front side of the display panel 81.

In general, in order to take in external light mainly from the upper edge of the screen, the reflection type display apparatus of the kind described above is used such that the direction inclined toward the upper edge of the screen (toward the left side in FIG. 21) with respect to the direction vertical to the screen is oriented in the direction from which brighter external light is obtained. The display is viewed from about the front surface direction which is close to the direction vertical to the screen or from about the direction which is inclined toward the lower edge of the screen from the vertical direction.

The conventional reflection type display apparatus using the diffusion reflection plate 82 has a problem that the display is dark. This is because the light reflected by the diffusion reflection plate 82 is widely diffused in directions which do not enter into the display panel 81 and the portion of the reflection light which can be used as illumination light is only the portion of light within a diffusion range within which light enters into the display panel 81. Therefore, the amount of light which enters into the display panel 81 decreases. Further, the. spreading angle of light which is transmitted through the display panel 81 and emitted to the front side is large, so that the brightness of light emitted in the observation angle in which the display is viewed is low.

Display on a display apparatus is normally observed directly from the front side, as described above. In a conventional reflection type display apparatus, the spreading angle of light emitted to the front side of the display panel 81 is large, and only the portion of light emitted directly in the front direction is observed by an observer, and the other portion of the light emitted in oblique directions is not substantially observed by the observer. Therefore, actually observed display is dark as described above.

In case where a mirror reflection plate is used in place of the diffusion reflection plate 82, regular reflection light reflected by the mirror reflection plate is emitted strongly in a specific direction at an angle symmetrical to the incidence angle with respect to the normal line of the reflection plate. However, since the intensity of light emitted in the direction toward the observer of the display panel 81 is weak, display is dark. In addition, since the reflection plate has a mirror structure, the surface distribution of the intensity of the reflection light is not uniform. Further, an environmental background view including the face of the observer and interior illumination devices is reflected on the display.

BRIEF SUMMARY OF THE INVENTION

The present invention has an object of providing a reflection plate having directivity, which is capable of sufficiently brightening display observed in a direction from an observer, and a display apparatus using the reflection plate.

In order to achieve the above object, the reflection plate having directivity according to a first aspect of the present invention comprises: a reflection film including a flat reflection surface; and an optical film having a first optical surface provided on the reflection surface and inclined in a first direction with respect to a normal line of the reflection surface thereby to reflect or refract light entering thereinto, second optical surfaces inclined in a second direction opposite to the first direction thereby to reflect or refract light entering thereinto, and a front surface into which external light enters and from which reflected light from the reflection surface and reflection light and/or refracted light from the first and second optical surfaces are emitted.

In the reflection plate having directivity according to the first aspect, incidence light which has entered within a wide angle range is emitted within a narrower angle range than the incidence angle range of the incidence light, by the reflection surface which reflects the incidence light as light having a strong light intensity in a predetermined direction, by reflection of light and a refraction effect inside the optical film, and by a strong reflection effect of the reflection surface.

This reflection plate may be provided such that the front surface (or emission surface) of the optical film is substantially parallel to the reflection surface of the reflection film.

Also, the first and second optical surfaces may be respectively arranged at inclination angles different from each other with respect to the normal line of the reflection surface of the reflection film. As a result of this, incidence light can be more effectively converged and emitted into the observation direction of from an observer.

The first and second optical surfaces may be provided to cross each other and grooves each having a triangular cross-section are formed in a side of a back surface of the optical film. Or, another third optical surface which crosses the first and second optical surfaces may be provided and a groove having a rectangular cross-section (which is substantially a trapezoid) may formed in the back surface side of the optical film.

A substance having a lower refraction ratio than the optical film may occupy the insides of the grooves having the triangular cross-section and the rectangular cross-section. As a result of this, the refraction effect or the reflection effect depending on the optical surfaces may be ensured.

By comprising the third optical surface, this third optical surface may be provided at a small angle with respect to the reflection surface, and therefore, much more reflection light from the reflection surface can be guided to the direction toward the front surface of the optical film.

The third optical surface should be preferably provided to be substantially parallel to the reflection surface of the reflection film. As a result of this, grooves each having a substantially trapezoidal cross-section may be formed in the back surface side of the optical film, by the first to third optical surfaces.

The display apparatus comprising a reflection plate having directivity, according to a second aspect of the present invention comprises: a liquid crystal display panel including liquid crystal between a pair of substrates; and a reflection plate having directivity and including a reflection film having a flat reflection surface, and an optical film having a first optical surface provided in the reflection surface and inclined in a first direction with respect to a normal line of the reflection surface thereby to reflect or refract light entering thereinto, second optical surfaces inclined in a second direction opposite to the first direction thereby to reflect or refract light entering thereinto, and a front surface into which external light enters and from which reflected light from the reflection surface and reflection light and/or refracted light from the first and second optical surfaces are emitted.

According to the display apparatus comprising the reflection plate having directivity according to the second aspect, incidence light which enters within a wide angle range enters from the front surface of the liquid crystal display panel, is emitted from the back surface of the liquid crystal display panel, and thereafter enters into the front surface of the reflection plate having directivity. Further, the light is reflected as light having a high light intensity into a predetermined direction by the reflection surface, and light can be emitted within a narrower angle range than the incidence angle range of incidence light by reflection and refraction effects inside the optical film. The emission light or reflection light emitted from the front surface of the reflection plate having directivity enters into the back surface of the liquid crystal display panel, with the light converged within a narrower angle range than the incidence angle range of incidence light, and is transmitted through the liquid crystal display panel. The light is then emitted from the front surface of the liquid crystal display panel.

The reflection plate having directivity includes: a reflection member having a reflection film having a flat reflection surface; an optical film having a flat front surface and a plurality of groove-like concave portions formed along a predetermined direction in a back surface thereof, which is opposed to the reflection surface of the reflection member; and a substance occupying the groove-like concave portions of the optical film and having a lower refraction ratio than the optical film, wherein boundary surfaces against the substance in each of the groove-like concave portions of the optical film are at least two inclined surfaces inclined at inclination angles different from each other with respect to a normal line of the reflection surface of the reflection member, and form the first and second optical surfaces which reflect or transmit incidence light entering into the boundary surfaces, in correspondence with incidence angles thereof.

The display apparatus according to the present invention further may comprise an incidence angle selective plate provided between the back surface of the liquid crystal display panel and the reflection plate having directivity, for diffusing and emitting light entering from a predetermined direction within a predetermined angle range, in a predetermined divergence direction.

The incidence angle selective diffusion plate has such a incidence angle dependence that a transmission ratio and a diffusion ratio of incidence light change in accordance with an incidence angle, and has a transmission axis plane onto which a plurality of lights enter at an incidence angle which maximizes the transmission ratio of the incidence light, and a diffusion axis plane including a plurality of lights entering at a incidence angle which maximizes the diffusion ratio, with respect to a surface of the diffusion plate, and wherein the diffusion axis plane is provided to be directed in an observation direction inclined to a lower edge side of the screen with respect to a direction vertical to the screen.

Since the display apparatus is capable of selectively diffusing light emitted in the observation direction inclined to the lower edge side of the screen which is lower than the reflection plate having directivity, a sufficient view angle characteristic can be obtained from a predetermined observation direction.

The incidence angle selective diffusion plate may has a transmission ratio and a diffusion ratio which change in accordance with an incidence angle of incidence light, and has a transmission axis plane including a plurality of lights entering at an incidence angle which maximizes the transmission ratio of the incidence light, and a diffusion axis plane including a plurality of lights entering at a incidence angle which maximizes the diffusion ratio, with respect to a surface of the diffusion plate. The diffusion axis plane may be provided to be directed in a direction toward left and right side edges of the screen of the liquid crystal display panel, with respect to a direction vertical to the screen. The incidence angle selective diffusion plate may has an optical characteristic of diffusing and emitting light entering from a direction inclined to the left and right edge sides of the screen with respect to the direction vertical to the screen, in the observation direction. In this case, the display apparatus diffuses light emitted from the front surface of the reflection plate having directivity into the direction toward the left and right side edges of the screen, and the view angle from the lateral direction can be improved. In addition, when external light enters from the left and right edge sides of the screen, the incidence light is diffused and can thereafter be let enter into the reflection plate having directivity, so that the light which enters from the upper edge side of the screen into the front surface of the reflection plate having directivity can be increased to increase the light intensity of light emitted to the lower edge side of the screen.

Further, the incidence angle selective plate may characterized in that this plate is constructed in a layer structure consisting two layers, each of the layers has a transmission axis plane which maximizes the transmission ratio and a diffusion axis plane which maximizes the diffusion ratio, and the diffusion axis plane of one of the layers and the diffusion axis plane of the other one of the layers are arranged so as to cross each other at right angles.

Note that the reflection member of the reflection plate having directivity of the display apparatus according to the second aspect may be a semi-transmission reflection plate and a back light is provided behind the reflection member.

Therefore, light from the back light provided in the back surface can be used in addition to light entering from the front side of the liquid crystal display panel, so that the back light can be lightened in use in an situation that environmental light provides insufficient brightness.

Also, the reflection member of the reflection plate having directivity in the display apparatus according to the second aspect includes a light emission element having a light transmission characteristic and a reflection plate provided behind the light emission element. Therefore, light from the light emission element provided in the back surface can be used in addition to light entering from the front side of the liquid crystal display panel, so that the light emission element can be lightened in use in an situation that environmental light provides insufficient brightness.

Further, the display apparatus according to the second aspect of the present invention further may comprise light diffusion means for diffusing incidence light into a predetermined direction, provided on a front surface of the display panel and/or between a back surface of the display panel or between a front surface of the reflection plate. Therefore, light which enters into the front surface of the reflection plate can be received as diffused light, and the diffused light is reflected by the reflection plate having directivity and can be emitted as diffused light within a predetermined emission angle range.

In addition, by providing the light diffusion means both on the front surface of the liquid crystal display panel and between the back surface of the display panel and the front surface of the reflection plate having directivity, the effect of light diffusion can be increased.

Note that the liquid crystal display panel includes a liquid crystal display element and a polarization plate on an outer surface of the liquid crystal display element. A roughened film or a diffusion particle mix film provided integrally on an outer surface of the polarization plate may be used as the light diffusion means.

Additional objects and advantages of the invention will be set forth in the description which follows, and in part will be obvious from the description,-or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Liquid crystal display devices will be described below as embodiments of the present invention with reference to the accompanying drawings.

[First Embodiment]

Figure 1:
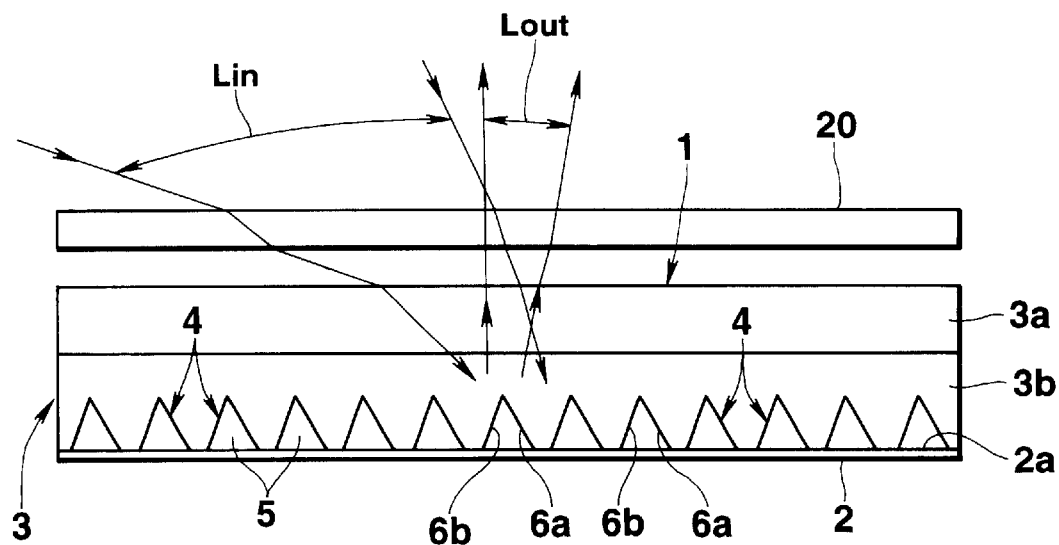
FIG. 1 is a cross-sectional view showing a reflection plate having directivity according to a first embodiment of the present invention.
Figure 2:
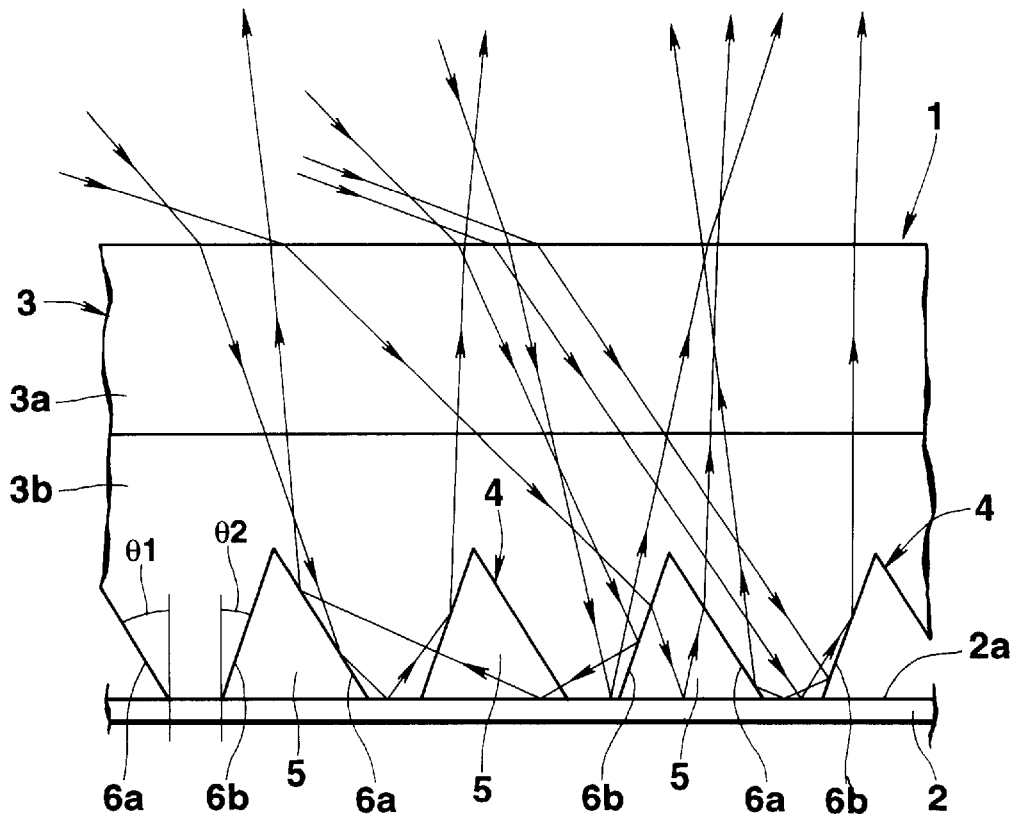
FIG. 2 is an enlarged cross-sectional view in which optical paths of incidence light and emission light according to the first embodiment are indicated by arrows.

FIGS. 1 and 2 show a first embodiment of the present invention. FIG. 1 shows the structure of a reflection type display apparatus comprising a reflection plate having directivity. FIG. 2 shows an enlarged part of a transmission passage of light in FIG. 1.

The display apparatus according to the present embodiment comprises a transmission type display panel 20 and a reflection plate 1 having directivity and provided to be opposed to the back surface of the display panel 20, as shown in FIG. 1. Note that the display panel 20 is made of, for example, a liquid crystal display panel, and the liquid crystal display panel may be of an active matrix type, a simple matrix type, or a segment type. The display system thereof may be any of a TN (Twisted Nematic) system, STN (Super Twisted Nematic) system, ECB (Birefringence) system, dynamic diffusion effect system, and a system using ferroelectric liquid crystal, as long as the system controls the transmission ratio of light.

As shown in FIGS. 1 and 2, the reflection plate 1 comprises: a reflection film 2a having a flat-surface-like reflection surface 2 which performs mirror reflection as a reflection member; a first light guide member 3 made of an optical film and having a flat front surface and a back surface where groove-like concave portions 4 extending along a predetermined direction form a plurality of lines parallel to each other; and second light guide members 5 respectively provided in the groove-like concave portions 4 of the first light guide member 3 and having a smaller refraction ratio than the first light guide member 3.

On the reflection surface 2, for example, a flat-surface-like reflection film 2a on which silver or aluminum is deposited or plated is provided on the entire of at least one surface of a resin film, and the reflection film 2a forms a mirror surface.

The first light guide member 3 is an optical film made of a transparent resin material such as acrylic or triacetylcellulose (which desirably has no optical anisotropy). On the entire region of the back surface of the optical film, groove-like concave portions 4 having a length corresponding to the lateral width of the film (which is the width in the direction vertical to the sheet surface of the figure) are formed in parallel with each other.

In the first embodiment, the first light guide member 3 is constructed in a structure in which a flat-plate-like transparent plate 3a in the front surface side is adhered onto a transparent plate 3b in the back surface side where the groove-like concave portions 4 are formed. In this structure in which the first light guide member 3 has adhered plates, the front transparent plate 3a and the back transparent plate 3b are preferably made of resin materials which have an equal refraction ratio or refraction ratios which are different from each other by a very small difference, and both transparent plates 3a and 3b are also preferably adhered to each other with use of an adhesive. In this manner, the first light guide member 3 can be rendered substantially as conductive as an integral molding object which does not cause substantially refraction of light at the interface between both of the transparent plates 3a and 3b.

Otherwise, both the transparent plates 3a and 3b may be made of only one integrated transparent plate.

Each of the groove-like concave portions 4 formed in the back surface of the first conductive member 3 is a groove-like concave portion having a triangular cross-section and having two optical interfaces 6a and 6b inclined in directions opposite to each other. Both optical interfaces of each groove-like concave portion 4 are inclined at inclination angles different from each other toward the depth direction of the groove-like concave portion 4.

The groove-like concave portions 4 are formed to be parallel to each other at a predetermined interval, and portions of the back surface of the light guide member 3 between the groove-like concave portions 4 of the light guide member 3 are formed as flat surfaces parallel to the front surface of the light guide member 3.

Although the groove-like concave portions 4 are exaggerated in FIG. 1, for convenience, the width of each groove-like concave portion 4 formed on the back surface of the first light guide member 3 (which is the widest width of each groove) is set to a very small width of about 40 to 100 $\mu$m. In this case, the pitch of the groove-like concave portions 4 is set to 50 to 150 $\mu$m. The width of the flat surface in the back surface in contact with the reflection surface 2 is set to ¼ to ½ of the width of the groove-like concave 4.

In the first light guide member 3, the first light guide member 3 is adhered onto the reflection surface 2 by a transparent adhesive not shown (e.g., an adhesive double-coated tape), with the flat portion between each pair of adjacent groove-like concave portions 4 kept in contact with the reflection film 2a of the reflection surface 2.

A second light guide member 5 is provided so as to occupy the inside of each of groove-like concave portions 4 of the first light guide member 3, and an air layer is used, for example. That is, the refraction ratio of the second light guide member 5 is selected to be smaller than the refraction ratio of the first light guide member 3.

Further, the interfaces between the first light guide member 3 and the second light guide member 5 form optical interfaces 6a and 6b.

The inclination angles $\theta 1$ and $\theta 2$ at which the optical interfaces 6a and 6b are respectively inclined with respect to the normal line of the front surface of the first light guide member 3 and the reflection surface 2 of the reflection film 2a satisfy a relation of $\theta 1 > \theta 2$.

The reflection plate 1 having directivity as described above is provided behind the display panel 20 such that the optical interfaces 6a having a larger inclination angle ($\theta 1$) to the normal line of the reflection surface 2 of the reflection film 2a among the optical interfaces 6a and 6b of both of each groove-like concave portion 4 are directed toward the upper edge side (in the left side of FIG. 1) of the screen (which is the front surface of the display panel 20) as the direction in which external light is mainly taken in by the display apparatus is while the optical interfaces 6b having a smaller inclination angle ($\theta 2$) are directed toward an observer positioning at the lower edge side of the screen, as shown in FIG. 1.

This display apparatus reflects external light such as natural light and/or room light entering into the front surface of the display panel 20 by means-of the reflection plate 1 having directivity as described above and illuminates the display panel 20 from back side by reflection light reflected from the plate 1. As indicated by an arrow in the figure, the external light entering into the front surface of the display panel 20 passes through the display panel 20 and is reflected by the reflection plate 1 having directivity. Then, the reflection light enters again into the display panel 20 from the back surface and is emitted from the front surface in the direction toward the observer.

In this case, the reflection type display apparatus is normally observed from the direction inclined toward the lower edge side such that the direction inclined toward the upper edge side of the screen with respect to the direction vertical to the screen is directed in the direction in which brighter external light is inclined toward the upper edge side. Thus, external light is mainly taken in from the upper edge side.

Further, in case of the reflection type display apparatus according to the present embodiment, among the optical interfaces 6a and 6b in both sides of each groove-like concave portion 4 of the first light guide member 3 of the reflection plate 1 having directivity, the first interface 6a inclined at a larger angle to the normal line of the reflection film 2a of the reflection surface 2 is directed toward the upper edge side of the screen while the second optical interface 6b inclined at a smaller inclination angle is directed toward the lower edge side of the screen. Therefore, the light which has entered into and passed through the front surface of the display panel 20 mainly enters into the optical interfaces 6a having the larger inclination angle with respect to the normal line of the front surface of the first light guide member 3.

The light which has entered into the reflection plate 1 having directivity enters into the front surface of the first light guide member 3 at various angles as indicated by an arrow in FIG. 2 and is refracted at the interface between the front surface and external air.

Further, the light which has entered into the first light guide member 3 is transmitted through the light guide member 3 in the direction toward the back surface, and that portion of this light which is directed toward the surface at which the back surface and the reflection member 2 are kept in contact with each other enters into the reflection film 2a of the reflection surface 2 from the back surface-of the first light guide member 3 and is thereby reflected toward the front surface. The other portion of the light which is directed toward the groove-like concave portions 4 enters into either one of the interfaces 6a and 6b in both sides of each groove-like concave portion 4.

Of this light, the light which has entered into the optical interfaces 6a and 6b at an angle larger than the total reflection critical angle of reflection is entirely reflected by the optical interfaces 6b and 6a and runs in the direction into the first light guide member 3. This light then enters into the back surface of the first light guide member 3 and/or opposed optical interfaces 6b and 6a and is emitted toward the front surface of the first light guide member 3 while repeating reflection in a similar manner. In addition, the light which has entered into the optical interfaces 6a and 6b at an angle (which is nearly vertical) smaller than the total reflection critical angle is transmitted through the optical interfaces 6a and 6b, is refracted toward the back surface, and enters into the second light guide member 5.

That is, among each paired optical interfaces 6a and 6b, the second interface 6b inclined at a smaller angle is positioned close to the light entering side than the first interface 6a having a larger angle.

Light entering into the second light guide member 5 is thus refracted toward the back surface because the optical interfaces 6a and 6b of the first light guide member 3 are respectively surfaces which are inclined toward the depth direction of the groove-like concave portion 4 with respect to the normal line of the front surface of the first light guide member 3 and the reflection surface 2 of the reflection member 2a, light enters into the optical interfaces 6a and 6b from the front surface side of the first light guide member 3, and because the refraction ratio at the second light conductive member 5 is smaller than the refraction ratio of the first light guide member 3.

The light reflected by the optical interfaces 6a and 6b and refracted toward the back surface of the first light guide member 3 enters into the reflection surface 2 of the reflection member 2a from the back surface of the first light guide member 3 in accordance with the direction in which the light is refracted or enters into the optical interfaces 6b and 6a in the opposite side.

The light which has thus entered into the optical interfaces in the opposite side is reflected by the optical interfaces 6b and 6a and refracted toward the front surface in accordance with the angle at which the light enters, or the light is transmitted through the second light guide member 5, enters into the reflection surface 2 of the reflection plate 2a, and is reflected toward the front surface.

Further, that portion of the light reflected by the reflection surface 2 of the reflection film 2a which enters into the reflection surface 2 from the back surface between the groove-like concave portions 4 of the first light guide member 3 is .transmitted through the first light guide member 3 toward the front surface and is emitted from the front surface. That portion of the reflection light which is reflected toward the optical interfaces 6a and 6b is reflected by the optical interfaces 6a and 6b and refracted toward the front surface, and is emitted from the front surface of the first light guide member 3.

In addition, reflection light of the light which has been transmitted through the second light guide members 5 and entered into the reflection surface 2 enters into the optical interfaces 6a and 6b from the second light guide member 5 and is refracted toward the front surface by the optical interfaces 6a and 6b, to enter into the first light guide member 3. This light is transmitted through the first light guide member 3 toward the front surface and is emitted from the front surface. Of the light which has been refracted by the optical interfaces 6a and 6b and has entered into the first light guide member 3, that portion of light which is directed toward the optical interfaces 6b and 6a in the opposite side is reflected by the optical interfaces 6b and 6a in the opposite side, refracted toward the front surface, and is emitted from the front surface of the first light guide member 3.

The light emitted from the front surface of the first light guide member 3 is light having a divergent angle range (Lout) larger than the incidence angle range (Lin) of the light which has entered into the front surface of the first light guide member 3, and the emission direction of this light is determined by the refraction angles of the first and second light guide members 3 and 5 and by the inclination angles θ1 and θ2 of the optical interfaces 6a and 6b in both sides of the groove-like concave portion 4.

That is, the reflection plate 1 having directivity as described above serves so that the entering light within a predetermined angle range (Lin), which has entered from the front surface of the first light guide member 3, and the reflection light, which has been reflected by the reflection surface 2, are refracted by the optical interfaces 6a and 6b as interfaces between the first light guide member 3 and the second light guide member 5, and so that the reflection light reflection light is emitted from the front surface of the first light guide member 3 in a predetermined direction at a divergent angle range (Lout) smaller than the incidence angle range of the incidence light. Accordingly, reflection light of the light which has entered at various angles from the direction of inclination of the optical interface 6a having a larger inclination angle to the normal line of the reflection surface 2 of the reflection film 2a among the optical interfaces 6a and 6b in both sides of each groove-like concave portion 14 can be converged and emitted in a predetermined direction.

The emission direction of the reflection plate 1 having directivity is determined by the refraction ratios of the first and section light guide members 3 and 5 and the inclination angles θ1 and θ2 of the optical interfaces 6a and 6b in both sides. Therefore, by appropriately selecting these ratios and angles, light can be emitted in the front direction of the reflection plate 1 having directivity, i.e., in the direction close to the normal line of the front surface of the light guide member 3.

In the reflection plate 1 having directivity and shown in FIGS. 1 and 2, the second light guide member 5 is an air layer having a refraction ratio of 1. The refraction ratio of the first light guide member 3 is 1.63±0.05. Of the optical interfaces 6a and 6b in both sides of the groove-like concave portion 4, the optical interface 6a which is inclined to the main incidence direction of light has an inclination angle θ1 of 30°±50°, and the other optical surface 6b has an inclination angle θ2 of 20°±5°. The reflection plate having the directivity serves to converge and emit reflection light of light which has entered at various incidence angles from the inclination direction of the optical interface 6a having the larger inclination angle.

The light which has been transmitted through the first light guide member 3 in the direction toward of front surface is transmitted and emitted through the interface between the front surface of the light guide member 3 and the external air. However, the light which has been transmitted through the light guide member 3 enters in a direction substantially vertical to this interface or at an angle close to the right angles. Therefore, refraction of emission light at this interface is not substantially caused but light is emitted in a direction perpendicular to the front surface of the light guide member 3.

Further, the reflection type display apparatus according to the embodiment described above is provided with a reflection plate having directivity by which incidence light entering from the front surface is reflected to be opposed to the back surface of the display panel 20 and the reflection light therefrom is emitted in a predetermined direction to the front surface at a divergence angle smaller than the incidence angle range of the incidence light. Therefore, display observed from a predetermined direction can be sufficiently brightened.

That is, the reflection plate 1 having the directivity described above acts such that the reflection light of light which has entered at various incidence angles from the inclination direction of the optical interface 6a having a larger inclination angle with respect to the normal line of the reflection surface 2 of the reflection member 2a is converged and emitted in a predetermined direction. Further, in the reflection type display apparatus, the reflection plate 1 having directivity is provided in the direction toward the upper edge side of the screen as a main external light taking-in direction. Therefore, the light which has entered from the main external light taking in direction and transmitted through the display panel 20 can be taken in into the reflection plate 1 from the inclination direction of the optical interface 6a having the larger inclination angle, and the reflection light therefrom is emitted in a predetermined direction and enters into the display panel 20 from the back surface.

Therefore, according to this reflection type display apparatus, external light can enter into the display panel 20 from a predetermined direction and reflection light having a smaller divergence angle can be emitted toward an observer, so that display observed from a predetermined direction can be sufficiently brightened.

Further, the emission direction of reflection light of the reflection plate 1 having directivity is determined by the refraction ratios of the first and second light guide members 3 and 5 and the inclination angles θ1 and θ2 of the optical interfaces 6a and 6b in both sides. Therefore, by selecting the ratios and angles such that light is emitted in the front surface direction of the reflection plate 1 having directivity, the emission direction of light which enters into the display panel 20 from its back surface and is emitted from the front surface can be set to a direction close to the normal line of the front surface, and thus, display can be achieved with a high front surface luminance.

The reflection plate 1 having directivity according to the first embodiment is formed such that each groove-like concave portion 4 is formed to have a triangular cross-section having two side surfaces inclined in directions opposite to each other. However, the groove-like concave portion 4 may have any cross-sectional shape such as a polygonal shape or other shape as long as at least two side surfaces thereof are inclined surfaces, and the optical interfaces between these in dined surfaces and the second light guide member 5 are respectively optical surface 6a and 6b which may reflect or transmit entering light in accordance with the incidence angle of the entering light.

In the reflection plate 1 having directivity according to the first embodiment, the second light guide member 5 provided in each of the groove-like concave portions 4 of the first light guide member 3 is an air layer. The second light guide member 5 is not limited to an air layer but may be a transparent layer such as a resin layer or the like which has a smaller refraction ratio than the first light guide member 3. In this case, the reflection plate 1 having the directivity can be manufactured in a method in which second light guide members 5 are formed in form of a plurality of lines on the reflection surface 2 of the reflection member 2a, and a transparent resin or the like having a large refraction ratio is applied thereon, so that the portions covering the second light guide members become groove-like concave portions 4.

Also, in the first embodiment, the optical interface having the larger inclination angle is provided in the upper edge side of the screen of the display apparatus and the other optical interface having the smaller inclination angle is provided at the lower edge side. However, the inclination angles of the optical interfaces, the refraction ratios of the first and second light guide members, and the dimensions of the groove-like concave portions provided in the first light guide member can be appropriately set so that the intensity of emission light emitted from the display panel becomes high in the direction inclined slightly to the lower edge side from the front surface of the display apparatus. For example, an optical interface having a small inclination angle may be provided in the upper edge side.

Further, the reflection type display apparatus according to the first embodiment uses a liquid crystal display panel as the display panel 20. However, the display panel 20 may be another electro-optical display element or an image print film having a light-transmission character.

[Second Embodiment]

Figure 3:
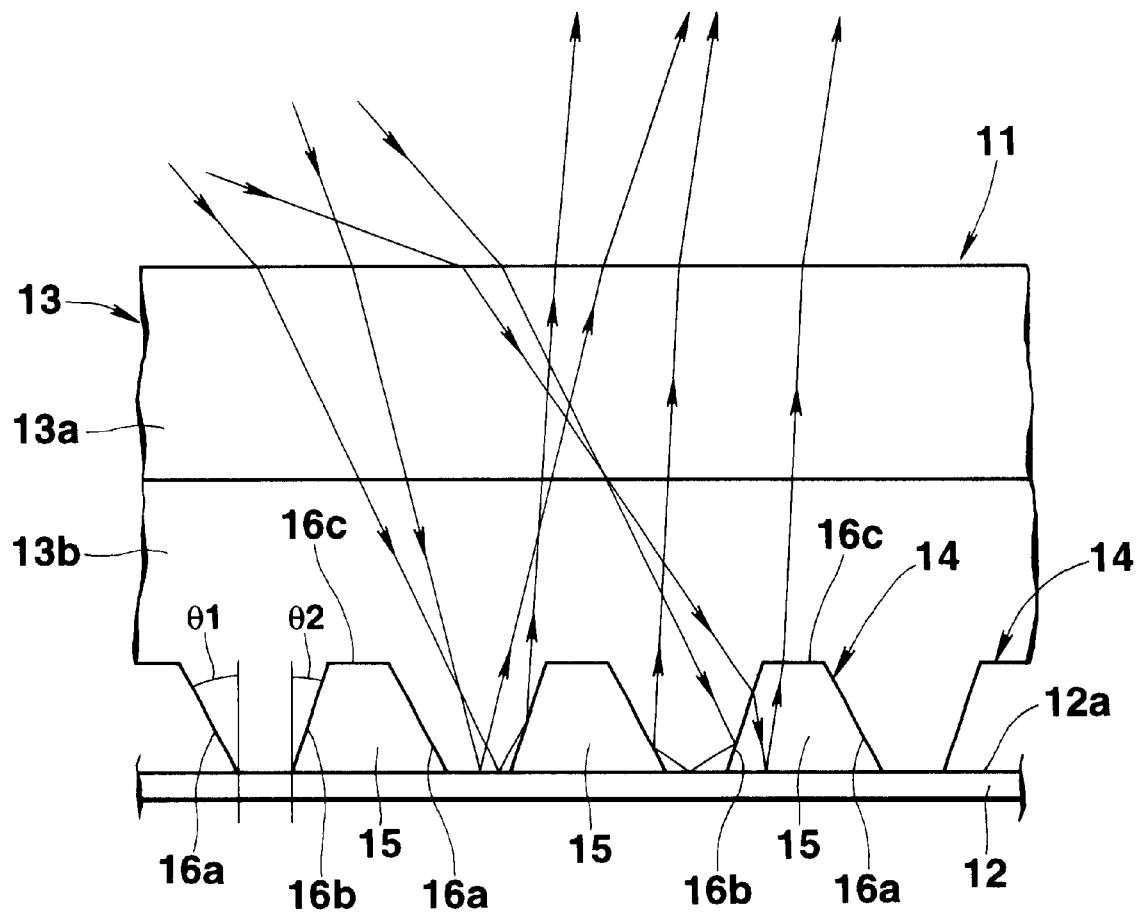
FIG. 3 is an enlarged cross-sectional view showing a reflection plate having directivity according to a second embodiment of the present invention.

FIG. 3 is an enlarged cross-sectional view of a part of a reflection plate having directivity, showing a second embodiment of the present invention. The reflection plate 11 having directivity according to this embodiment comprises an optical film in which each of groove-like concave portions 14 provided in the back surface of a first light guide member 13 is formed to have a substantially trapezoidal cross-section with two side surfaces inclined in directions opposed to each other and a bottom surface substantially parallel to a reflection surface 12 of a reflection film 12a.

Optical interfaces between the first light guide member 13 and each of second light guide members 15 in the groove-like concave portions 14 have optical interfaces 16a and 16b respectively consisting of the two side surfaces, and the upper surface is a transmission surface 16c.

In the reflection plate 11 having directivity according to the second embodiment, not only light which is transmitted through the optical interfaces 16a and 16b as both side surfaces but also light which is transmitted through a transmission surface 16c as the bottom surface of the groove-like concave portion 14 (viewed from under side) is refracted as indicated by an arrow in the figure. Refraction surfaces which refract light are thus increased. Accordingly, the light which enters from the front surface of the first light guide member 13 can be emitted from the front surface of the first light guide member 13 in a predetermined direction at a divergence angle range (Lout) smaller than an incidence angle range (Lin) of the entering light even if a material having a relatively small refraction ratio is used for the first light guide member 13.

The reflection plate 11 having directivity as described above serves so that the entering light within a predetermined angle range (Lin), which has entered from the front surface of the first light guide member 13, and the reflection light, which has been reflected by the reflection surface 12, are refracted by the optical interfaces 16a and 16b in both sides of the groove-like concave portion 14 of the first light guide member 13 and the transmission surface 16c as the bottom surface of the groove-like concave portion 14, and so that the reflection light is emitted from the front surface of the first light guide member 13 in a predetermined direction at a divergence angle range (Lout) smaller than the incidence angle range (Lin) of the entering light. Accordingly, reflection light of the light which has entered at various angles from the inclination direction of the optical interface 16a having a larger inclination angle with respect to the normal line of the reflection surface 12 of the reflection film 12a among the optical interfaces 16a and 16b in both sides of each groove-like concave portion 14 can be converged and emitted in a predetermined direction.

The reflection plate 11 having directivity and shown in FIG. 3 is an air layer having a refraction ratio of 1. The refraction ratio of the first light guide member 13 is 1.49±0.05. Of the optical interfaces 16a and 16b in both sides of the groove-like concave portion 14, the first optical interface 16a which is inclined with respect to the main incidence direction of light has an inclination angle θ1 of 30°±5°, and the second optical surface 16b has an inclination angle θ2 of 20°±5°. The reflection plate 11 having this directivity serves to converge and emit reflection light of light which has entered at various incidence angles from the inclination direction of the optical interface 16a having the larger inclination angle.

In the reflection plate 11 having directivity according to the second embodiment, the second light guide member 15 provided in each of the groove-like concave portions 14 of the first light guide member 13 is an air layer. The second light guide member 15 is not limited to an air layer but may be a transparent layer such as a resin layer or the like which has a smaller refraction ratio than the first light guide member 13. In this case, the reflection plate 11 having the directivity can be manufactured in a method in which second light guide members 15 are formed in a plurality of lines in the reflection surface 12 of the reflection member 12a, and a transparent resin or the like having a large refraction ratio is applied therein, so that the portions covering the second light guide members become groove-like concave portions 14.

Also, in the second embodiment, the optical interface having the larger inclination angle is provided in the upper edge side of the screen of the display apparatus and the other optical interface having the smaller inclination angle is provided at the lower edge side. However, the inclination angles of the optical interfaces, the refraction ratios of the first and second light guide members, and the dimensions of the groove-like concave portions provided in the first light guide member can be appropriately set so that the intensity of emission light emitted from the display panel becomes high in the direction inclined slightly to the lower edge side from the front surface of the display apparatus. For example, an optical interface having a small inclination angle may be provided in the upper edge side.

Further, the reflection type display apparatus according to the second embodiment uses a liquid crystal display panel as the display panel 20. However, the display panel 20 may be another electro-optical display element or an image print film having a light-transmission character.

[3rd Embodiment]

Figure 4:
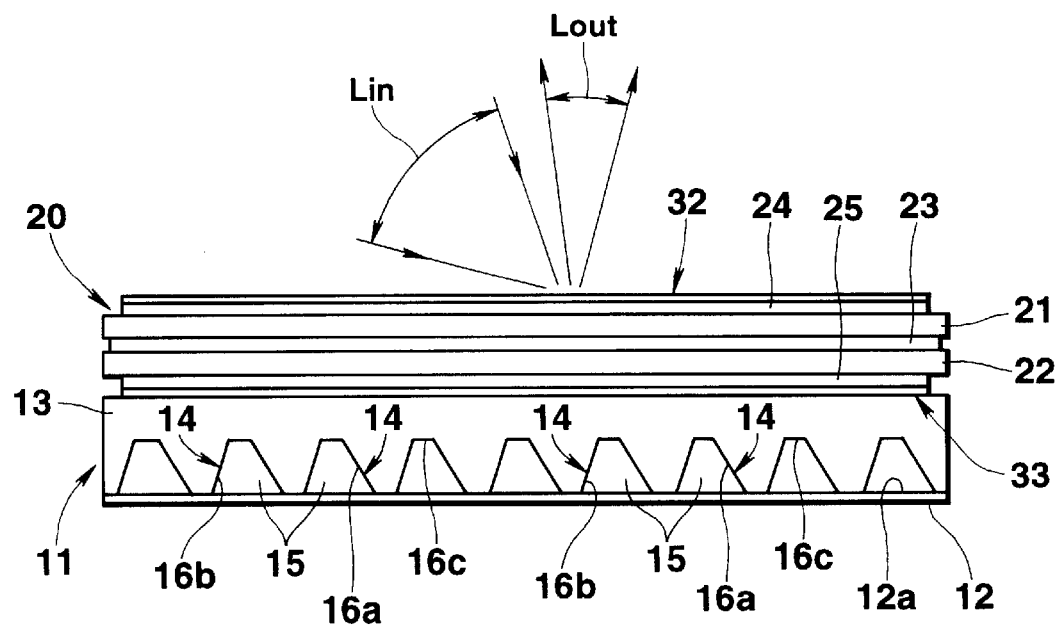
FIG. 4 is a cross-sectional view showing a display apparatus according to a third embodiment of the present invention.
Figure 5:
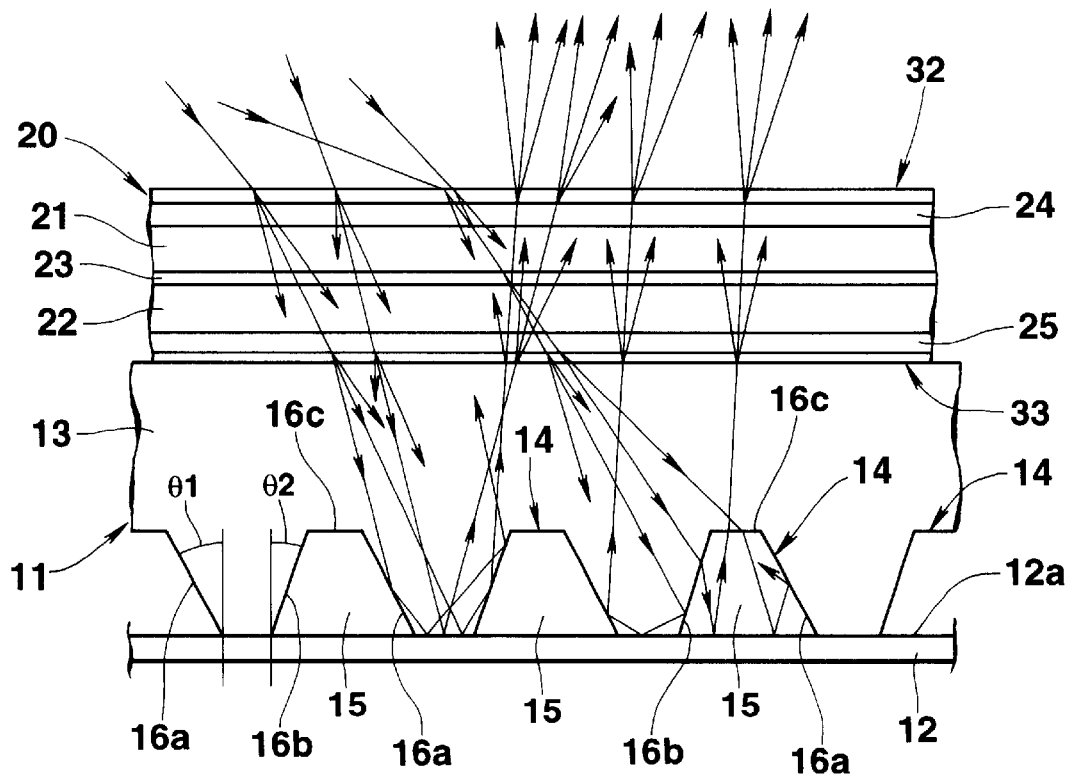
FIG. 5 is an enlarged view showing a part of the display apparatus according to the third embodiment of FIG. 4 in which optical paths of incidence light and emission light are indicated by arrows.

FIG. 4 shows the structure of the reflection type display apparatus, showing a third embodiment of the present invention. FIG. 5 shows an enlarged part of the reflection type display apparatus to show a light transmission passage.

The reflection type display apparatus according to the present embodiment uses a liquid crystal display panel as a transmission type display panel for controlling transmission of light to achieve display. As shown in FIGS. 4 and 5, this display apparatus comprises a liquid crystal display panel 20 of a transmission type, a reflection plate 11 shown in the second embodiment and provided to be opposed to the back surface of the liquid crystal display panel 20, and a first light diffusion means 32 provided on the front surface of the liquid crystal display panel 20, and a second light diffusion means 33 provided between the back surface of the liquid crystal display panel 20 and the reflection plate 11 having directivity. The other respects of the structure are the same as those of the second embodiment described above, and therefore, reiteration of explanation will be omitted by marking common reference symbols in the figure.

Note that the display panel 20 is, for example, a liquid crystal display panel which may be of an active matrix type, a simple matrix type, or a segment type. The display system thereof may be any of a TN (Twisted Nematic) system, an STN (Super Twisted Nematic) system, an ECB (Birefringence) system, a dynamic diffusion effect system, and a system using ferroelectric liquid crystal, as long as the system controls the transmission ratio of light.

In the liquid crystal display panel 20, a pair of transparent substrates 21 and 22 are joined with frame-like sealing members 23 inserted therebetween, and liquid crystal is encapsulated in the region surrounded by the sealing member between both of the substrates 21 and 22. Transparent electrodes for applying an electric field to the liquid crystal layer are provided on inner surfaces of the substrates 21 and 22, and polarization plates 24 and 25 are respectively provided on outer surfaces of the substrates 21 and 22.

Next, explanation will be made of the first light diffusion means 32 provided on the front surface of the liquid crystal display panel 20, and the second light diffusion means 33 provided between the back surface of the liquid crystal display panel 20 and the front surface of the reflection plate 11 having the directivity. In this embodiment, the light diffusion means 32 and 33 are integrally provided on outer surfaces of a pair of polarization plates 24 and 25, respectively, and these polarization plates 24 and 25 are arranged to have a light diffusion function.

Figure 6:
FIG. 6 is a cross-sectional view showing a diffusion member used in the display apparatus according to the third embodiment.

At first, the first light diffusion means 32 provided on the front surface of the liquid crystal display panel 20 will be explained. FIG. 6 is an enlarged cross-sectional view showing an example of the polarization plate 24 in the front surface side, where hatching is omitted therefrom. A roughened film 34 is provided as the light diffusion means 32 on the entire outer surface of the polarization plate 24. The roughened film 34 is formed by applying a transparent resin 34a on the entire outer surface and by performing roughing process on the entire film surface thereof into a fine convexconcave surface 34b. The size and pitch of the convex and concave portions on the surface are substantially uniform over the entire surface.

Figure 7:
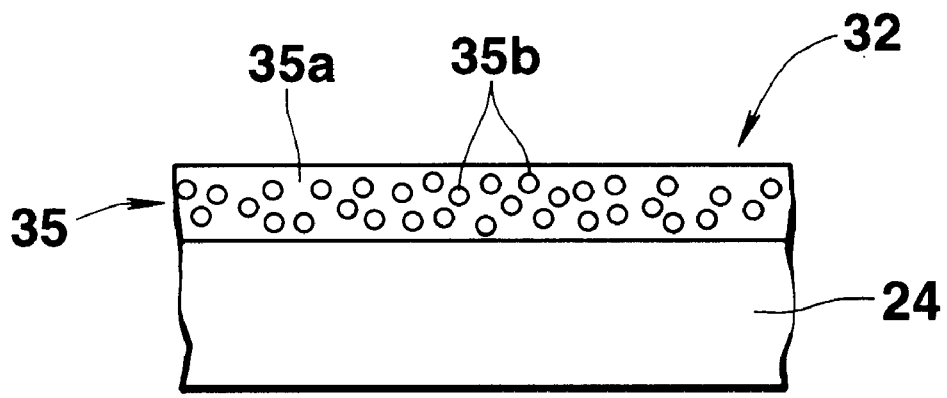
FIG. 7 is a cross-sectional view showing another diffusion member used in the display apparatus according to the third embodiment.

FIG. 7 is an enlarged cross-sectional view showing another example of the polarization plate 24 in the front surface side where hatching is omitted, and the polarization plate 24 is formed by providing a diffusion particle mix film 35 as the light diffusion means 32 on the entire outer surface thereof. The diffusion particle mix film 35 is formed in a manner in which fine diffusion particles 35b are substantially uniformly diffused and mixed in a transparent resin 35a which is applied on the entire outer surface of the polarization plate 24 and each fine diffusion particle has a refraction ratio different from that of the transparent resin 35a.

Other than the two examples described above, the light diffusion means 32 formed on the front surface of the front polarization plate 24 may be formed by making same processing as surface reflection prevention processing generally performed on the front surface of a liquid crystal display element or the like. Further, the roughened film 34 shown in FIG. 6 and the surface reflection prevention processing may be adopted together, or the diffusion particle mix film 35 shown in FIG. 7 and the surface reflection prevention processing may be adopted together.

Next, the second light diffusion means 33 provided on the back surface of the liquid crystal display panel 20 will be explained below. The light diffusion means 33 should preferably be of a diffusion particle mix type and desirably be set in tight contact with the front surface of the first light guide member 13 as the emission surface of the reflection plate 11 having directivity.

Figure 8:
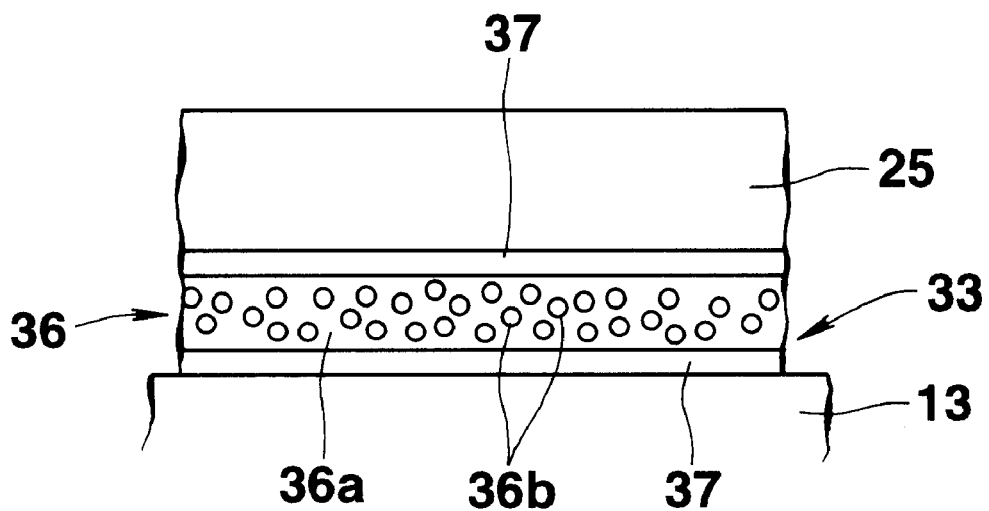
FIG. 8 is a cross-sectional view showing further another diffusion member used in the display apparatus according to the third embodiment.

FIG. 8 is an enlarged cross-sectional view showing an example of the back polarization plate 25 where hatching is omitted therefrom. The polarization plate 25 is obtained by providing a diffusion particle mix film 36 as a light diffusion means 33 on the entire outer surface of the polarization plate 25. The diffusion particle mix film 36 is obtained in a manner in which a particle mix resin obtained by substantially uniformly diffusing diffusion particles 36b in a transparent resin 36a is shaped like a film and the diffusion particle mix film 36 has a refraction ratio different from that of a transparent resin 36a in the transparent resin 36a. A transparent adhesive 37 is applied onto each of both surfaces of the diffusion particle mix film 36.

Further, one surface of the diffusion particle mix film 36 is adhered onto the outer surface of the polarization plate 25 by the adhesive 37 and is integrated with the polarization plate 25. The other surface of the film 36 is adhered onto the front surface of the first light guide member 13 of the reflection plate 11 having the directivity as described above by the adhesive 37.

Figure 9:
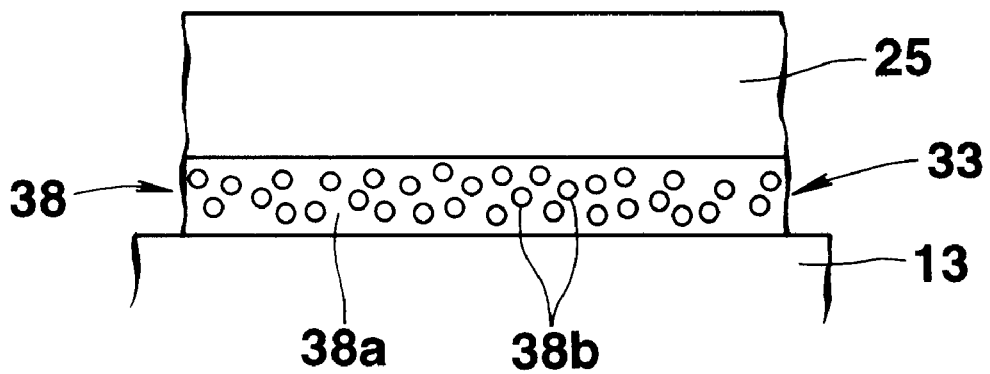
FIG. 9 is a cross-sectional view showing further another diffusion member used in the display apparatus according to the third embodiment.

FIG. 9 is an enlarged cross-sectional view showing another example of the back polarization plate 25, and an adhesive diffusion particle mix film 38 is integrally provided as a light diffusion means 33 on the entire outer surface. The diffusion particle mix film 38 is formed in a manner in which a particle mix adhesive obtained by substantially uniformly diffusing diffusion particles 38b in a transparent adhesive resin 38a is applied onto the outer surface of the polarization plate 25 and the particle mix adhesive has a refraction ratio different from the transparent adhesive resin 38a. The other surface of the diffusion particle mix film 38 is adhered onto the front surface of the first light guide member 13 of the reflection plate 11 having the directivity by its adhesive characteristic.

In this reflection type display apparatus, external light such as natural light, room light, or the like which enters from the front side of the liquid crystal display panel 20 is reflected by the reflection plate 11 having the directivity and the liquid crystal display panel 20 is illuminated by the reflection light to achieve display.

As indicated by an arrow in FIG. 5, external light which enters into this reflection type display apparatus is diffused by a first light diffusion means 32 provided on the front surface side of the liquid crystal display panel 20 and enters into the front surface of the liquid crystal display panel 20. The light which is transmitted through the liquid crystal display panel 20 is diffused by the second diffusion means 33 between the back surface of the liquid crystal display panel 20 and the front surface of the reflection plate 11 having the directivity (or the front surface of the first light guide member 13) and enters into the front surface of the first light guide member 13 of the reflection plate 11 having the directivity at various incidence angles.

In this case, the reflection type display apparatus is used on condition that the direction inclined toward the upper edge side of the screen with respect to the direction vertical to the screen is oriented in the direction in which bright external light is obtained. The display is normally observed from the front surface direction, i.e., from an area in the vicinity of the direction vertical to the screen, or from an area in the vicinity of the direction slightly inclined toward the lower edge side of the screen from the vertical direction. Therefore, external light is mainly taken in from the upper edge side, i.e., the upper edge side of the liquid crystal display panel 20.

Further, in this reflection type display apparatus, as described above, the reflection plate 11 having the directivity is provided such that the first optical interface 16a having a larger inclination angle (of $\theta_1$) with respect to the normal line of the reflection surface 12 of the reflection film 12a among the optical interfaces 16a and 16b in both sides of each groove-like concave portion 14 is directed so as to face in the direction toward the upper edge side of the screen as the main external light take-in direction. Therefore, external light enters from the front side of the liquid crystal display panel 20 and is transmitted through the liquid crystal display panel 20. Then, this light enters into the first light guide member 13 of the reflection plate 11 having the directivity from its front surface, at various incidence angles in the direction along the inclination direction of the optical interface 16a having the larger inclination angle.

A part of the external light which has entered into the first light guide member 13 is directed toward the back surface portions (each being a portion between adjacent groove-like concave portions 14) which are in contact with the reflection surface 12 of the reflection member 12a. This light is reflected in a direction toward the front surface by the reflection surface 12 at the back surface portion and is emitted from the front surface of the light guide member 13.

In addition, a part of the external light which has entered into the first light guide member 13 from its front surface is directed to the groove-like concave portions 14. This light enters any of the optical interfaces 16a and 16b in both sides of the groove-like concave portion 14 and the transmission surface 16c.

The light directed to the groove-like concave portions 14 enters into the optical interfaces 16a and 16b in both sides of the groove-like concave portion 14 at incidence angles larger than the total reflection critical angle and is entirely reflected by the optical interfaces 16a and 16b, thereby to run in the first light guide member 13.

Further, a part of the light entirely reflected by the optical interfaces 16a and 16b is directed to the back surface portions of the light guide member 13 (which are portions between groove-like concave portions 14) and is reflected by the reflection surface 12. This part then directly runs toward the front surface of the light guide member 13 and is emitted therefrom. The other part of the light entirely reflected by the optical interfaces 16a and 16b is directed to the optical interfaces 16a and 16b of adjacent groove-like concave portions 14 and enters into the optical interfaces 16a and 16b of the adjacent groove-like concave portions 14. This light is then entirely reflected to the front surface by the optical interfaces 16b and 16a and is emitted from the surface of the light guide member 13.

In addition, the external light which has entered into the first light guide member 13 from its front surface becomes light which enters into the optical interfaces 16a and 16b in both sides of each groove-like concave portion 14 at angles (which are close to the vertical direction) smaller than the total reflection critical angle. This light is transmitted through the optical interfaces 16a and 16b, refracted in a direction toward the back surface, and enters into the second light guide member 15. The light which has entered into the second light guide member 15 is thus refracted in the back surface direction,.because the optical interfaces 16a and 16b of the first light guide member 13 are respectively surfaces inclined with respect to the normal line of the front surface of the first light guide member 13 and light enters from the front surface direction of the first light guide member 13 into the optical interfaces 16a and 16b, and because the refraction ratio of the second light guide member 15 is smaller than the refraction ratio of the first light guide member 13.

In addition, a part of the external light which has entered into the first light guide member. 13 from its front surface becomes light which enters into the light transmission surface 16c of the groove-like concave portion 14. Most of this light is transmitted through the transmission surface 16c, refracted in the back surface direction, and enters into the second light guide member 15. Further, the light which has been transmitted through the optical interfaces 16a and 16b and the transmission surface 16c, refracted in the back surface direction, and entered into the second light guide member 15 runs inside the second light guide member 15 toward the back surface and is reflected by the reflection surface 12.

The light reflected from the reflection surface 12 runs inside the second light guide member 15 and enters into any of the optical interfaces 16a and 16b and the transmission surface 16c, and the light which has thus entered into the transmission surface 16c is transmitted through the transmission surface 16c, refracted in the direction extending to be close to the normal line of the front surface of the first light guide member 13, transmitted through the first light guide member 13 toward the front surface, and is emitted from the front surface. In addition, the other part of the light which has passed through the second light guide member 15 and entered into the optical surfaces 16a and 16b is entirely reflected toward the front surface in accordance with the incidence angles to the optical interfaces 16a and 16b, and enters into the transmission surface 16c or the optical interfaces 16a and 16b in the opposite sides of the same groove-like concave portion 14. This light is transmitted through the transmission surface 16c or the optical interfaces 16a and 16b, refracted in the direction extending to be close to the normal line of the front surface of the first light guide member 13, transmitted through the first light guide member 13 toward the front surface, and is emitted from the front surface. Or, this light is transmitted through the optical interfaces 16a and 16b and enters into the first light guide member 13, refracted in the direction extending to be close to the normal line of the front surface of the first light guide member 13, transmitted through the first light guide member 13 toward the front surface, and is emitted from the front surface.

Thus, in the reflection plate 11 having the directivity described above, external light taken in from the upper edge side of the screen (or the upper edge side of the liquid crystal panel 20) in the main incidence direction of external light and transmitted through the liquid crystal panel 20 into the first light guide member 13 is refracted toward the back surface direction by optical interfaces 16a and 16b as boundary surfaces between both side surfaces of the groove-like concave portions 14 of the first light guide member 13 and the second light guide member 15, so as to enter into the reflection surface 12. The reflection light reflected from the reflection film 12a is reflected into the direction extending to be close to the normal line of the front surface of the light guide member 13 and is emitted from the front surface of the first light guide member 13.

Thus, the reflection plate 11 functions to converge and emit light which enters from the main incidence direction of external light at various incidence angles range (Lin), into a predetermined direction with a smaller divergence angle range (Lout) than the incidence angle range (Lin).

Further, the light emitted from the front surface of the first light guide member 13 through various passages described above, i.e., the light reflected by the reflection plate 11 is diffused by the second light diffusion means 33 so as to enter into the liquid crystal display panel 20 from its back surface, and light transmitted through the liquid crystal display panel 20 is diffused by the first light diffusion means 32 and is emitted toward the front side.

According to this reflection type display apparatus, external light enters from the front side of the liquid crystal display panel 20, is transmitted through the liquid crystal display panel 20, and is thereafter reflected in a predetermined direction with a divergence angle range (Lout) smaller than the incidence angle range (Lin) with respect to the reflection plate 12 by the reflection plate 11 having the directivity described above. This reflection light is transmitted through the liquid crystal display panel 20 and is emitted to the front side. Therefore, display observed from a predetermined direction can be sufficiently brightened.

That is, the reflection plate 11 having the directivity described above is provided such that the optical interface 16a having the larger inclination angle (of θ1) with respect to the normal line of the reflection surface 12 of the reflection film 12a among the interfaces 16a and 16b in both sides of the groove-like concave portion 14 is directed toward the upper edge side of the screen which is the main external light take-in direction. Therefore, the light which enters from the main incidence direction of external light at various incidence angles or angle range (Lin) is reflected into a predetermined direction at a smaller divergence angle or angle range (Lout) than the incidence angle range (Lin), so that the emission light emitted to the front side of the reflection type liquid crystal display apparatus becomes light having a divergence angle range (Lout) of which is smaller than the external light incidence angle range (Lin) of the light entering from the front side of the liquid crystal display panel 20, as shown in FIG. 4.

Further, the emission direction of the light which has entered from the main external light take-in direction and has been reflected by the reflection plate 11 is determined by the refraction ratios of the first and second light guide members 13 and 15 of the reflection plate having directivity and by the inclination angles θ1 and θ2 of the optical interfaces 16a and 16b in both sides. Therefore, by appropriately selecting the ratios and angles, display observed from the front surface direction, e.g, from an area close to the direction vertical to the front surface of the liquid crystal display panel 20 can be brightened sufficiently.

In the reflection plate 11 having directivity and shown in FIGS. 4 and 5, the second light guide member 15 is an air layer having a refraction ratio of 1. The refraction ratio of the first light guide member 13 is 1.49±0.05. Of the optical interfaces 16a and 16b in both sides of the groove-like concave portion 14, the optical interface 16a which is inclined to the direction vertical to the front surface of the first light guide member has an inclination angle θ1 of 30°±5°, and the other optical surface 16b has an inclination angle θ2 of 20°±5°. The reflection plate 11 having the directivity serves to converge and emit reflection light of light which has entered at various incidence angles from the inclination direction of the optical interface 16a having the larger inclination angle, into the front surface direction.

In addition, in this third embodiment, each groove-like concave portion of the reflection plate 11 having directivity is formed to have a rectangular cross-section (or a trapezoid) which has two side surfaces inclined in different directions and at different angles and a bottom surface substantially parallel to the reflection surface of the reflection member. Therefore, not only at the optical interfaces 16a and 16b in both sides of the groove-like concave portion 14 but also at the transmission surface 16c as an interface between the upper surface of the groove-like concave portion 14 and the second light guide member 15, light transmitted through the transmission surface 16c is refracted as indicated by an arrow shown in FIG. 5.

Therefore, the light refraction surfaces of the reflection plate 11 having the directivity are increased, and accordingly, entering light can be emitted with a smaller divergence angle than the incidence angle range of the entering light with use of a relatively small refraction ratio.

Further, in the reflection type display apparatus described above, the first and second diffusion means 32 and 33 are respectively provided on the front surface of the liquid crystal display panel 20 and between the back surface of the panel 20 and the front surface of the reflection plate 11 having directivity. Therefore, the take-in range of taking in external light can be widened to brighten the display, and the view angle of the display can also be widened.

That is, the external light enters from the front side of the liquid crystal display panel 20 at various incidence angles. However, since the first light diffusion means 32 is provided on the front surface of the liquid crystal display panel 20, external light entering from the direction greatly inclined with respect to direction vertical to the front surface of the liquid crystal display panel 20 can be diffused by the light diffusion means 32 and can be taken in, as indicated by a passage shown in FIG. 5.

Accordingly, the take-in range of taking in external light can be widened to increase the amount of light to be taken in, so that the brightness of the reflection light reflected by the reflection plate 11 having the directivity can further be increased. The display can thus be brightened.

Further, when external light enters from the front surface of the liquid crystal display panel 20, external light from the front side of the liquid crystal display panel 20 is diffused by the light diffusion means 32. When light is transmitted through the liquid crystal display panel 20 and enters into the reflection plate 11 behind the panel 20, light is further diffused by the light diffusion means 33 provided between the back surface of the liquid crystal display panel 20 and the front surface of the reflection plate 11 having the directivity and is reflected by the reflection plate 11 having the directivity. Also, in the procedure in which light is transmitted through the liquid crystal display panel 20 and is emitted to the front side, light is diffused by the light diffusion means 33 and 32. Therefore, the view angle of the display can be widened.

Further, in the display apparatus described above, diffusion means 32 and 33 are respectively provided on the front surface of the liquid crystal display panel 20 and between the back surface of the panel 20 and the front surface of the reflection plate 11 having directivity. Even if means having relatively low haze ratios are used as the light diffusion means 32 and 33, it is possible to obtain a sufficiently wide view angle.

The haze ratio is a hazing value of a light diffusion means which is expressed by diffusion-light-transmission-ratio/total-light-transmission-ratio×100. The haze ratios of the light diffusion means 32 and the other light diffusion means 33 should preferably be within a range of 10 to 70.

If the haze ratios of the light diffusion means 32 and 33 are small, roughness of a display image caused by diffusion of light becomes less conspicuous, and it is therefore possible to display an image with an excellent quality without roughness.

Each of the light diffusion means 32 and 33 may be one single diffusion plate. However, in the present embodiment, roughened films 34 or diffusion particle mix films 35, 36, or 37 are integrally formed as the light diffusion means 32 and 33 on the outer surfaces of a pair of polarization plates 24 and 25 provided on the outer surfaces of the liquid crystal display panel 20, as shown in FIGS. 6, 7, 8, and 9. Therefore, the structure of the display apparatus can be simplified, compared with the case where single light diffusion means are respectively provided on the front surface of the liquid crystal display panel 20 and between the back surface of the liquid crystal display panel 20 and the front surface of the reflection plate 11 having directivity.

In the third embodiment described above, light diffusion means 32 and 33 are respectively provided on the front surface of the liquid crystal display panel 20 and between the back surface of the liquid crystal display panel 20 and the front surface of the reflection plate 11 having directivity. One of these light diffusion means 32 and 33 can be omitted.

In case where one of the light diffusion means 32 and 33 is thus omitted, the used haze ratio of the light diffusion means should preferably be set within a range of 20 to 80. As far as the haze ratio falls within this range, the view angle of the display apparatus can be widened in both of the cases where only the light diffusion means 32 is provided on the front surface of the liquid crystal display panel 20 and where only the light diffusion means 33 is provided between the back surface of the liquid crystal display panel 20 and the front surface of the reflection plate 11 having directivity.

However, if one of the light diffusion means 32 and 33 is thus omitted, it is better to maintain the light diffusion means 32 on the front surface of the liquid crystal display panel 20. If the light diffusion means 32 is provided on the front surface of the liquid crystal display panel 20, not only the view angle of the display apparatus can be widened, but also the take-in range of taking in external light can be widened as described above, so that the display can be much more brightened.

[4th Embodiment]

Figure 10:
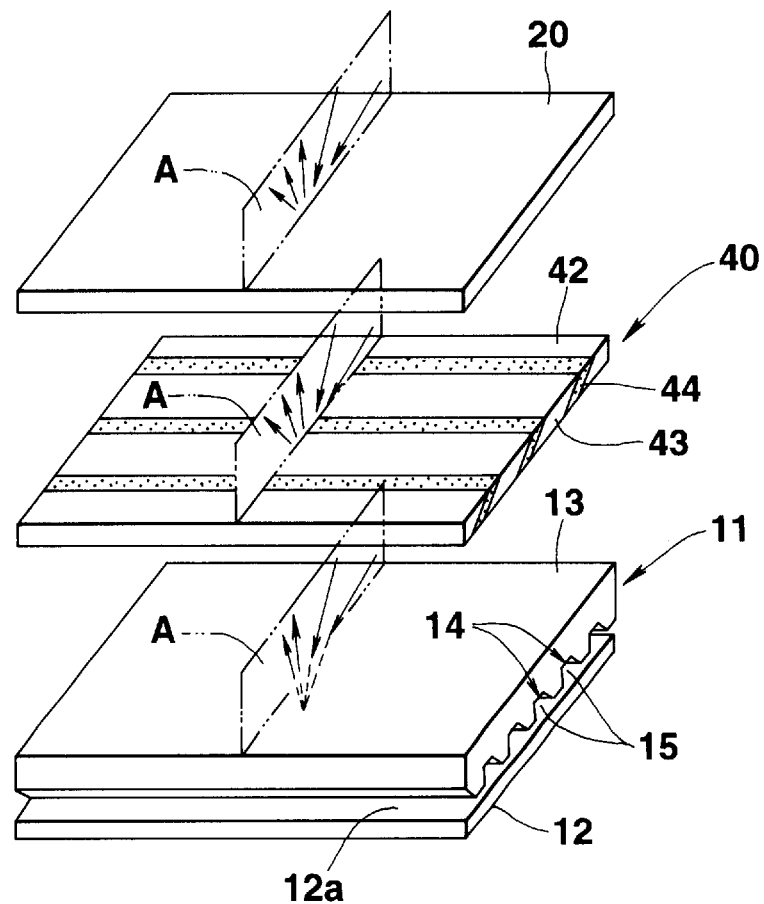
FIG. 10 is an exploded perspective view showing a display apparatus according to a fourth embodiment.
Figure 11:
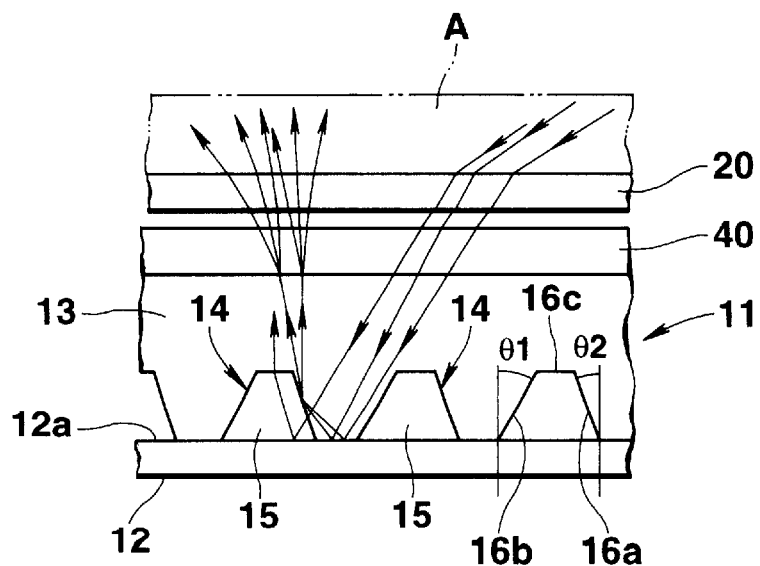
FIG. 11 is an enlarged view a part of the display apparatus according to the fourth embodiment of FIG. 10 in which passages of incidence light and emission light are indicated by arrows.

FIGS. 10 and 11 show a fourth embodiment of the present invention.

The display apparatus according to this fourth embodiment comprises a transmission type display panel 20, a reflection plate 11 having directivity and provided to be opposed to the back surface of the display panel 20, and an incidence angle selection diffusion plate or a light control plate 40 provided between the back surface of the display panel 20 and the reflection plate 11 having directivity, as shown in FIG. 10.

The reflection plate 11 has a characteristic that light entering from a particular direction among external light entering from the front side of the display panel 20 is converged into a predetermined direction, and reflection light which has a smaller divergence angle than the incidence angle range of entering light is emitted to the back surface of the display panel 10. The other points of the structure are the same as those of the second embodiment, and therefore, reiteration of explanation will be omitted by denoting common reference symbols.

The incidence angle selective diffusion plate 40 provided between the back surface of the display panel 20 and the reflection plate 11 having directivity serves to diffuse and emit light which enters at an incidence angle within a predetermined angle range from a particular direction, into a predetermined divergence direction. The plate 40 has an incidence angle dependency between the transmission ratio and the diffusion ratio of entering light which change in accordance with the incidence angle of entering light, and comprises a transmission axis plane including a plurality of lights which enter into the surface of the diffusion plate at an incidence angle which maximizes the transmission ratio of the entering light, and a diffusion axis plane which includes a plurality of lights which enter at an incidence angle which maximizes the diffusion ratio. This embodiment uses a plate 40 which has one only main divergence direction of diffusion light.

Figure 12:
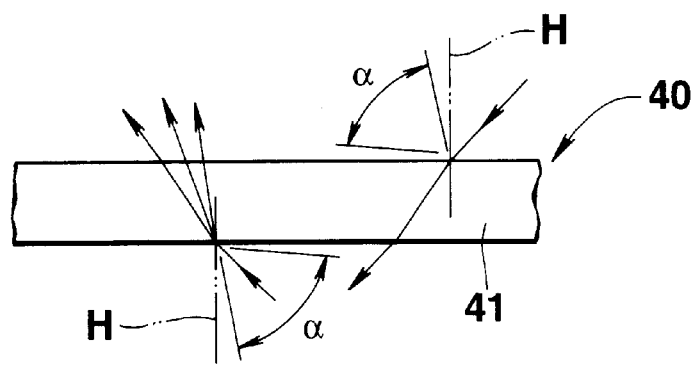
FIG. 12 is a cross-sectional view showing an optical characteristic of the incidence angle selective plate in the display apparatus according to the fourth embodiment.
Figure 13:
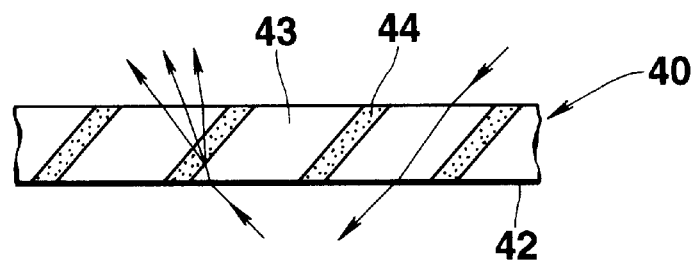
FIG. 13 is a cross-sectional view showing the structure of the incidence angle selective plate in the display apparatus according to the fourth embodiment.
Figure 14:
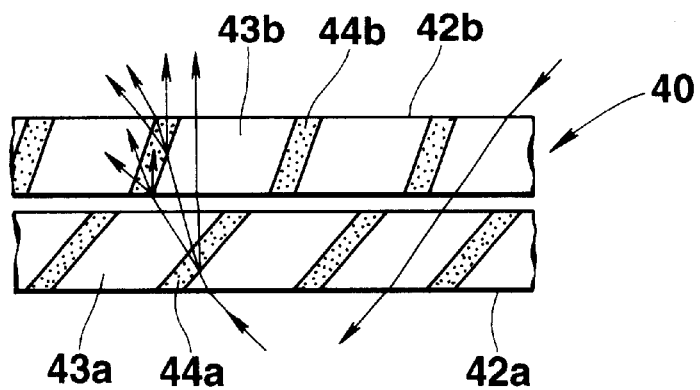
FIG. 14 is a cross-sectional view showing another incidence angle selective diffusion plate used in the display apparatus according to the fourth embodiment.

FIGS. 12, 13, and 14 are cross-sectional views showing several examples of the incidence angle selective diffusion plate 40. The incidence angle selective diffusion plate 40 shown in FIG. 12 is made of a selective diffusion film 41 having a selective diffusion characteristic of diffusing the light which has entered from a particular direction at an incidence angle within a predetermined angle range.

That is, the selective diffusion film 41 shown in FIG. 12 has a plurality of layers of light guide members having refraction ratios different from each other, and the layers are formed to be inclined at a predetermined angle with respect to the perpendicular H of the film surface. This film 4 has a selective diffusion characteristic of diffusing light which enters from a direction inclined to a particular direction with respect to the perpendicular H of the film surface at an incidence angle within a predetermined angle range α, among light which is transmitted through the film 41, and of not substantially diffusing light which enters from the particular direction at another incidence angle or light which enters from another direction.

The incidence angle selective diffusion plate 40 made of the selective diffusion film 41 shows an equal selective diffusion characteristic, with respect to. light which enters from one surface thereof and is emitted to the other surface thereof and with respect to light which enters from the other surface and is emitted to the one surface. Light which has entered from the particular direction at an incidence angle. within a predetermined angle range α is diffused and emitted, as indicated by arrows in the figure. Entering light from the particular direction at another incidence angle and entering light from another direction are emitted without being not substantially diffused, as indicated by arrows in the figure. The divergence direction of diffusion light diffused by the selective diffusion film 41 is a direction inclined to the direction of extension line of the entering direction of the diffused light, from an area close to the perpendicular H of the film surface.

The incidence angle selective diffusion plate 40 is made of a louver-like optical film (hereinafter referred to as a louver film) 42.

This louver film 42 is a film in which laterally elongated translucent layers 43 made of a colorless transparent resin or the like are formed to be parallel to each other with thin-film-like diffusion layers 44 made of a white transparent resin. The interfaces between both side surfaces of each translucent layer 43 and the diffusion layer 44 are each inclined at a predetermined angle in one direction with respect to the direction vertical to the film surface and are inclined surfaces parallel to each other.

The incidence angle selective diffusion plate 40 made of the louver film 42 has an equal selective diffusion characteristic, with respect to light which enters from one surface thereof and is emitted to the other surface thereof and with respect to light which enters from the other surface and is emitted to the one surface. Light which has been transmitted through the translucent layer along inclination direction of the interfaces between both side surfaces of the layer 43 and the diffusion layer 44 is emitted without being substantially diffused, as indicated by arrows in the figure. Light which enters into the diffusion layer 44 is diffused and emitted as indicated by arrows in the figure, in the step in which light is transmitted through the louver film 42. The divergence angle of this diffusion light is a direction inclined to the direction of extension line of the entering direction of the diffused light from the direction vertical to the film surface.

The incidence angle selective diffusion plate 40 shown in FIG. 14 includes two front and rear louver films 42*a* and 42*b* each constructed in a structure similar to that of the louver film 42 shown in FIG. 13.

Among the two louver films 42*a* and 42*b*, the inclination angle of the interfaces between the translucent layers 43*a* and the diffusion layers 44*a* of the louver film 42*a* in the back surface side is set to an angle substantially equal to that of the louver film 42 shown in FIG. 13, and the inclination angle of the interfaces between the translucent layers 43*b* and the diffusion layers 44*b* of the louver film 42*b* in the front surface side is smaller (to be close to the direction vertical to the film surface),than the inclination angle of the interfaces of the louver film 42*a* in the back surface side.

Further, in the two louver films 42*a* and 42*b*, the diffusion layers 44*a* and 44*b* are layered such that the diffusion axis planes which respectively maximize the diffusion ratios are parallel to each other. In FIG. 14, the two louver films 42*a* and 42*b* are provided with a distance maintained between these films. However, these louver films 42*a* and 42*b* are adhered to each other by a transparent adhesive or a double-coated adhesive sheet.

The incidence angle selective diffusion plate 40 made of the two louver films 42*a* and 42*b* has an equal selective diffusion characteristic, with respect to light which enters from one surface thereof and is emitted to the other surface thereof and with respect to light which enters from the other surface and is emitted to the one surface. Light which has been transmitted through the translucent layers 43*a* and 43*b* of both louver films 42*a* and 42*b* along the inclination directions of the translucent layers 43*a* and 43*b* is emitted without being substantially diffused, as indicated by arrows in the figure. Light which enters into one or both of the diffusion layers 44*a* and 44*b* of the louver films 42*a* and 42*b* is diffused and emitted as indicated by arrows in the figure, in the step in which light is transmitted through the two louver films 42*a* and 42*b*.

The light control plate 40 shown in FIG. 14 is made of two louver films 42*a* and 42*b* layered. However, the incidence angle selective diffusion plate 40 of this layer type may be made of three or more louver films whose inclination angles of interfaces are different from each other, where each of the interfaces is an interface between a translucent layer and a diffusion layer, and the three or more louver films are layered such that the diffusion axis planes of their own which maximize the diffusion ratios:are arranged to be substantially parallel to each other.

Further, the incidence angle selective diffusion plate 40 of this layer type may be a plate which has a selective diffusion characteristic as shown in FIG. 12 and which is made of a plurality of louver films whose incidence angles of light to be diffused are different from each other, and the plurality of louver films are layered such that the diffusion axis planes of their own which maximize the diffusion ratios are arranged to be substantially parallel to each other. Or, the plate 40 may be a plate in which the selective diffusion film 41 described above and the louver film 42 shown in FIG. 13 are layered such that the diffusion axis planes of their own which maximize the diffusion ratios are arranged to be substantially parallel to each other.

As shown in FIGS. 10 and 11, any one of the incidence angle selective diffusion plates 40 shown in FIGS. 12, 13, and 14 is provided such that one of the surfaces of the plate (which is the back surface of the louver film 42*a* in the back side in case of the louver film 42 shown in FIG. 14) is opposed to the front surface of the reflection plate 11, while the other surface (which is the front surface of the louver film 42*b* in the front side in case of the louver film 42 shown in FIG. 14) is opposed to the back surface of the display panel 20 and such that the diffusion axis plane which maximizes the diffusion ratio of the diffusion light emitted from the surface opposed to the back surface of the display panel 20 (which will be hereinafter called a front surface of the incidence angle selective diffusion plate 40) is directed in a direction toward the lower edge side with respect to the direction vertical to the screen of the display panel 20.

That is, the incidence angle selective diffusion plate 40 is directed in the direction toward the upper edge side (in the right side in FIG. 11) of the screen as the main external light take-in direction and is provided behind the display panel 20 such that the diffusion axis plane of light which enters into the incidence angle selective diffusion plate 40 from the back surface thereof and is emitted to the front surface thereof is directed in the direction toward the lower edge side of the screen (in the left side in FIG. 11) as an observation direction of the display. The incidence angle selective diffusion plate 40 is adhered onto the front surface of the first light guide member 13 as the front surface of the reflection plate 11 having directivity, by a transparent adhesive not shown or a double-coated adhesive sheet.

This display apparatus serves to reflect external light such as natural light or room light which enters from the front side of the transparent type display panel 20, by means of the reflection plate 11 having directivity and provided to be opposed to the back surface of the display panel 20, and also serves to illuminate the display panel 20 from the back surface by reflection light, thereby to achieve display. The external light which has entered from the front side is transmitted sequentially through the display panel 20 and the incidence angle selective diffusion plate 40 provided between the back surface and the reflection plate 11 having directivity and is reflected by the reflection plate 11 having directivity. The reflection light therefrom is transmitted sequentially through the incidence angle selective diffusion plate 40 and the display panel 10 and is emitted to the front side where an observer exists.

In this case, external light is mainly taken in from the upper edge side of the screen. In the display apparatus described above, however, since the incidence angle selective diffusion plate 40 is provided such that the entering direction of the portion of light which enters from the front surface and is emitted to the back surface without being diffused is directed in a direction toward the upper edge side of the screen as the main external light take-in direction of the display apparatus and such that the diffusion surface direction of light which enters into the incidence angle selective diffusion plate 40 from its back surface and is emitted to the front surface is directed in a direction toward the lower edge side of the screen as an observation direction of the display, light which has entered into the display panel 20 from its front side, has been transmitted through the display panel 20, and has entered into the incidence angle selective diffusion plate 40 is transmitted through the incidence angle selective diffusion plate 40 without being substantially diffused and enters into the reflection plate 11 having directivity, as indicated by arrows in FIG. 11.

Further, in the display apparatus described above, the reflection plate 11 having directivity and a converging function as described above is provided such that the first optical interface 16*a* of the optical interfaces 16*a* and 16*b* in both sides of the groove-like concave portion 14 of the first light guide member 13 is directed in a direction toward the upper edge side of the screen as a main external light take-in direction while the second optical interface 16*b* is directed in a direction toward the lower edge of the screen as an observation direction of the display. Therefore, Light which has entered from the upper edge side of the screen as the main external light take-in direction, has been transmitted through the incidence angle selective diffusion plate 40, and has entered into the reflection plate 11 having directivity is converged by the reflection plate 11 having directivity and is reflected toward the back surface of the display panel 20 as light with high brightness and with a smaller divergence angle than the incidence angle range of entering light. The emission direction of the reflection light from the reflection plate 11 is the front surface direction of the reflection plate 11 having directivity, as described above.

The external light which enters into the display apparatus form the front side of the screen enters not only from the upper edge side of the screen as the main entering direction of the display apparatus but also from the left and right side edge directions of the screen. However, light thus entering from the left and right sides is refracted by the optical interfaces 16*a* and 16*b* of the reflection plate 11 and the transmission surface 16*c*, converged to some extent, and emitted mainly in the front surface direction.

As has been described above, in this display apparatus, the reflection plate 11 having directivity converges light entering from a particular direction, into a predetermined direction, and emits reflection light having a smaller divergence angle than the incidence angle range of entering light, toward the back surface of the display panel. In addition, transmitted light which has entered from a particular direction at an incidence angle within a predetermined angle range is diffused and emitted in a predetermined divergence direction, by the incidence angle selective diffusion plate 40. Therefore, Light in the predetermined direction with high brightness, which has been reflected by the reflection plate 11 having directivity, passes through the incidence angle selective diffusion plate 40. Among this light, the light which has entered into the incidence angle selective diffusion plate 40 from a particular direction at an incidence direction within a predetermined angle range becomes light diffused in a predetermined divergence direction and then enters into the back surface of the display panel 20.

Therefore, according to this display apparatus, by selecting the convergence angle of light depending on the reflection plate 11 having directivity and the convergence direction of diffused light depending on the incidence angle selective diffusion plate 40 in correspondence with the observation direction of the display, the display observed from a particular direction can be sufficiently brightened and the view angle can be widened.

Also, in this embodiment, the incidence angle selective diffusion plate 40 is provided such that the diffusion axis plane which maximizes the diffusion ratio depending on the incidence angle selective diffusion plate 40 is directed in a direction inclined to the lower edge side of the screen with respect to the direction vertical to the screen of the display panel. Therefore, the view angle can be widened in the direction toward the lower edge side of the screen.

Specifically, in FIGS. 10 and 11, the plane A indicated by a two-dot chain line is a virtual plane vertical to the screen and extending along-the vertical direction of the screen. In the display apparatus according to the present embodiment, as indicated by arrows in the figure, Light which has entered along the virtual plane A from a direction inclined to the upper edge side of the screen with respect to the perpendicular of the screen, has been transmitted through the display panel 20 and the incidence angle selective diffusion plate 40, and has entered into the reflection plate 11 having directivity is converged and reflected into the front surface direction. This light further becomes diffused light spreading in a direction inclined to the lower edge side of the screen from the direction vertical to the screen by a diffusion effect corresponding to the incidence angle of the light of the incidence angle selective plate 40, enters into the display panel 20 from its back surface, and is emitted from the front surface of the display panel 20.

[Fifth Embodiment]

Figure 15:
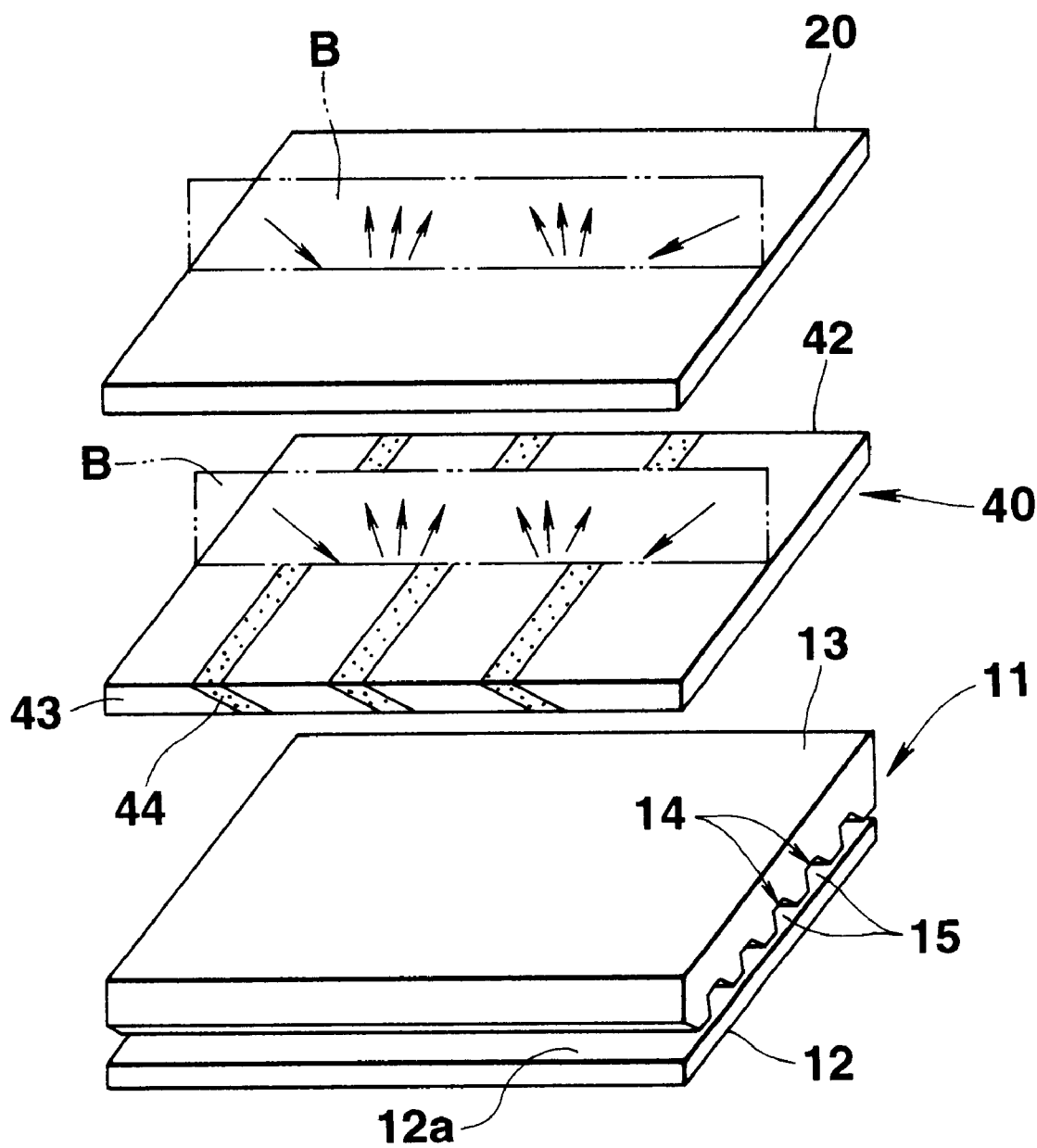
FIG. 15 is a cross-sectional view of a display apparatus according to a fifth embodiment.

In the display apparatus shown in FIG. 15 according to the fifth embodiment of the present invention, the reflection plate 11 having directivity is arranged with respect to the screen such that the plurality of lines of groove-like concave portions 14 provided in the back surface are arranged along the lateral edge direction (which is the horizontal direction) so that the incidence angle range of the light entering from the upper edge direction is reduced to be emitted in the lower edge direction. In addition, the incidence angle selective diffusion plate 40 described above whose transmission ratio and diffusion ratio are changed by the incidence angle is provided between the reflection plate 11 having directivity and the display panel 20 such that the diffusion axis plane which maximizes the diffusion ratio depending on the incidence angle is arranged along the lateral edge direction with respect to the screen of the display panel 20.

This fifth embodiment is different from the fourth embodiment described above only in the arrangement condition of the incidence angle selective diffusion plate 40. The other respects of the structure of the present embodiment are the same as those of the fourth embodiment. Reiteration of explanation will be omitted by marking common reference symbols in the figure.

According to the fifth embodiment, the incidence angle selective diffusion plate 40 is provided such that the diffusion axis plane which maximizes the diffusion ratio depending on the incidence angle selective diffusion plate 40 is arranged along the lateral edge direction (which is the horizontal direction) of the screen. Therefore, Light which has entered into the incidence angle selective diffusion plate 40 from the lateral edge direction of the screen can be let become diffused light and enter into the reflection plate 11 having directivity, so that the view angle can be widened in the lateral edge direction of the screen (which is the horizontal direction).

That is, in FIG. 15, the plane a indicated by a two-dot chain line is a virtual plane which is vertical to the screen and extends along the lateral edge direction of the screen.

In the display apparatus according to the fifth embodiment, external light enters as indicated by an arrow in the figure from a direction (which is the depth direction on the sheet surface of the figure) inclined to the upper edge side with respect to the direction vertical to the screen, and light which has been transmitted through the display panel 20 and the incidence angle selective diffusion plate 40 and has entered into the reflection plate 11 having directivity is converged and reflected into the front surface direction. Further, by the diffusion effect of the incidence angle selective diffusion plate 40 corresponding to the incidence angle of light, the light becomes diffused light which spreads along the lateral direction virtual plane B in the direction inclined to the lateral edges of the screen from the direction vertical to the screen, enters into the display panel 20 from its back surface, and is emitted from the front surface of the display panel 20.

Further, external light which has entered along the lateral direction virtual plane a becomes diffused light by the incidence angle selective diffusion plate 40, enters into the reflection plate 11 having directivity, and is emitted in the direction toward the lower edge of the screen with the emission angle range reduced by the reflection plate 11 having directivity. Light is then transmitted through the incidence angle selective diffusion plate 40 and is emitted from the front surface of the display panel 20.

Therefore, in the front surface direction of the screen, light which enters into the incidence angle selective diffusion plate 40 from the side edge sides of the screen is diffused by thus providing the incidence angle selective diffusion plate 40, and part of diffused light is reflected by the reflection plate 11 having directivity, so that the amount of light emitted in the direction toward the lower edge can be much more increased.

[Sixth Embodiment]

Figure 16:
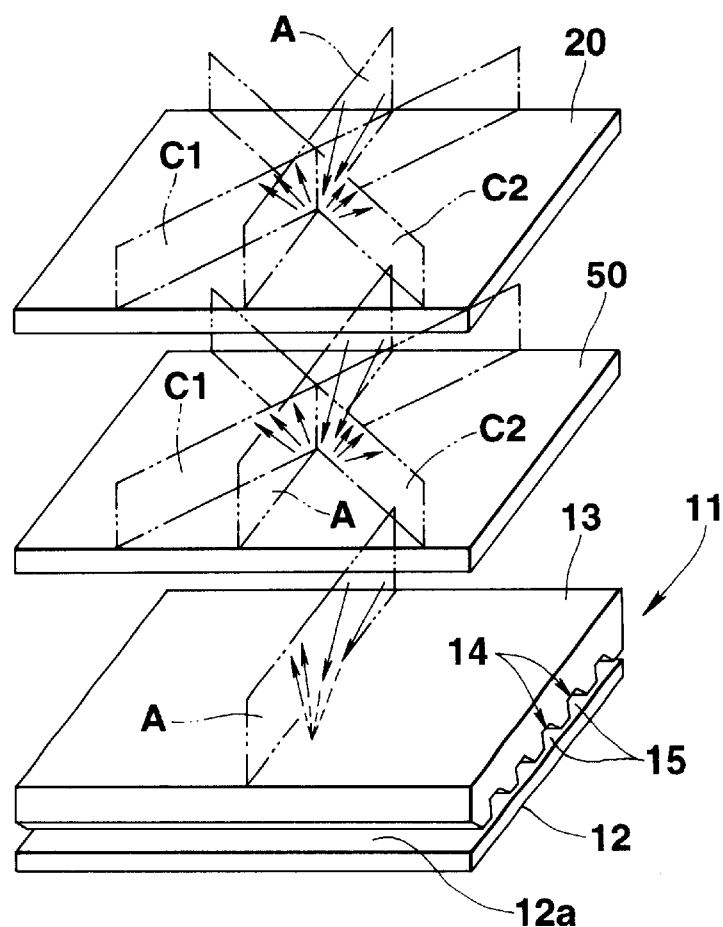
FIG. 16 is an exploded cross-sectional view of a display apparatus according to a sixth embodiment.

In the display apparatus shown in FIG. 16 according to the sixth embodiment, an incidence angle selective diffusion plate 50 having a plurality of incidence angles which maximize the diffusion ratio is provided between the back surface of the display panel 20 and the reflection plate 11 having directivity. The six embodiment is different from the fourth embodiment only in that the incidence angle selective diffusion plate 50 is provided but the other respects of the structure are the same as those of the fourth embodiment. Reiteration of explanation will be omitted by referring to common reference symbols in the figure.

Figure 17:
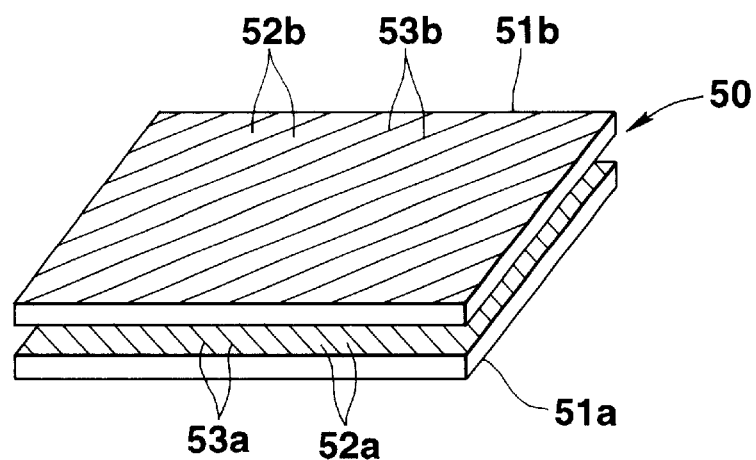
FIG. 17 is a perspective view showing the incidence angle selective diffusion plate in the display apparatus according to the sixth embodiment.

FIG. 17 shows the incidence angle selective diffusion plate 50 used in the sixth embodiment, and the incidence angle selective diffusion plate 50 includes two front and rear louver films 51$a$ and 51$b$.

The two louver films 51$a$ and 51$b$ are respectively films obtained by forming laterally elongated translucent layers 52$a$ and 52$b$ made of a colorless transparent resin or the like in parallel to each other, such that thin-film-like diffusion layers 53$a$ and 53$b$ made of a white transparent resin or the like are inserted as boundary layers. The interfaces between the translucent layers 52$a$ and the diffusion layers 53$a$, as well as the interfaces between the layers 52$b$ and 53$b$, are inclined surfaces which are parallel to each other and are inclined at a predetermined angle to the perpendicular of the film surface. Each of these louver films 51$a$ and 51$b$ has the same diffusion characteristic as the louver film 42 shown in FIG. 13 according to the fourth embodiment, and therefore, explanation of the diffusion effect thereof will be omitted.

The two louver films 51$a$ and 51$b$ are layered such that the diffusion axis planes which respectively maximize the diffusion ratios are crossed substantially at right angles. Although FIG. 17 shows the two louver films 51$a$ and 51$b$ with a distance maintained therebetween, these louver films 51$a$ and 51$b$ are adhered onto each other by a transparent adhesive or a double-coated adhesive sheet.

Further, according to the sixth embodiment, as shown in FIG. 16, the incidence angle selective diffusion plate 50 is provided such that the diffusion axis plane C2 of the louver film 51a among the two louver films 51a and 51b is directed in a direction inclined to the lower right of the screen with respect to the direction vertical to the screen, and the diffusion axis plane C1 of the other louver film 51b is directed in a direction inclined to the lower left of the screen with respect to the direction vertical to the screen.

According the display apparatus of the sixth embodiment, the diffusion axis planes C1 and C2 depending on the incidence angle selective diffusion plate 50 are provided along two directions of a lower left direction and a lower right direction with respect to the direction vertical to the sheet surface of the figure. Therefore, the view angle can be widened in these two directions.

Further, there are diffusion axis planes of two directions by which light entering into the incidence angle selective diffusion plate 50 become diffused, and the diffused light can be let enter into the reflection plate 11 having directivity. Therefore, the light diffused by the incidence angle selective diffusion plate 50 enters into the front surface of the reflection plate 11 having directivity, from a direction inclined to the upper edge side, and is emitted in the direction toward the lower edge side of the screen by the reflection plate 11.

Accordingly, by thus providing the incidence angle selective diffusion plate 50, the amount of light emitted in a direction toward the lower edge side of the screen can be much more increased.

That is, in FIG. 16, the plane A indicated by a two-dot chain line is a longitudinal virtual surface vertical to the screen and extending along the vertical direction of the screen. The other planes C1 and C2 indicated by two-dot chain lines are diffusion axis planes of the incidence angle selective diffusion plate 50 which are vertical to the screen and which respectively cross the longitudinal virtual plane A substantially at an angle of 45° in an left downward direction and in a right downward direction.

In the display apparatus according to the present embodiment, as indicated by arrows in the figure, the light which has entered into the longitudinal virtual plane A from the direction inclined to the upper edge side of the screen with respect to the direction vertical to the screen is transmitted through the display panel 20 and the incidence angle selective diffusion plate 50 and enters into the reflection plate 11 having directivity. Light is then converged and reflected into the direction toward the lower edge of the screen by the reflection plate 11 having directivity. Further, light reflected therefrom becomes diffused light which spreads along the diffusion axis plane C1 in a direction inclined to the lower left of the screen from an area close to the perpendicular of the screen, and diffused light which spreads along the other diffusion axis plane C2 in a direction inclined in a direction inclined to the lower left of the screen. The diffused light enters into the display panel 20 from its back surface and is emitted from the front surface of the display panel 20.

Also, light which has entered along the diffusion axis planes C1 and C2 becomes diffused light by the incidence angle selective diffusion plate 50. The portion of the diffused light which is diffused along the longitudinal virtual plane A enters into the reflection plate 11 having directivity and is emitted in the direction toward the lower edge side of the screen with its emission angle range reduced by the reflection plate 11 having directivity. This light is transmitted through the incidence angle selective diffusion plate 50 and is emitted from the front surface of the display panel 20.

Accordingly, the amount of light emitted in the direction toward the lower edge side of the screen can be increased since light entering from the left and right edge sides of the screen into the incidence angle selective diffusion plate 50 is changed into diffused light and is then reflected by the reflection plate 11 having directivity, by thus providing the incidence angle selective diffusion plate 50.

The incidence angle selective diffusion plate 50 shown in FIG. 17 is thus made of two layered louver films 51a and 51b. However, the incidence angle selective diffusion plate 50 may be made of a plurality of layered diffusion films 41 which have a selective diffusion characteristic as shown in the fourth embodiment in FIG. 12 and which have incidence angle ranges different from each other with respect to light to become diffused light, such that the directions of the films 41 in which the films have respectively maximum diffusion ratios cross each other at substantially right angles. Or, the plate 50 may be made of the selective diffusion film 41 and a louver film 42 as shown in FIG. 12, which are layered such that the directions of their own diffusion planes cross each other at substantially right angles. Further, the plate 50 may be one optical film having a diffusion characteristic of having a plurality of main divergence directions of diffused light.

[Seventh Embodiment]

Figure 18:
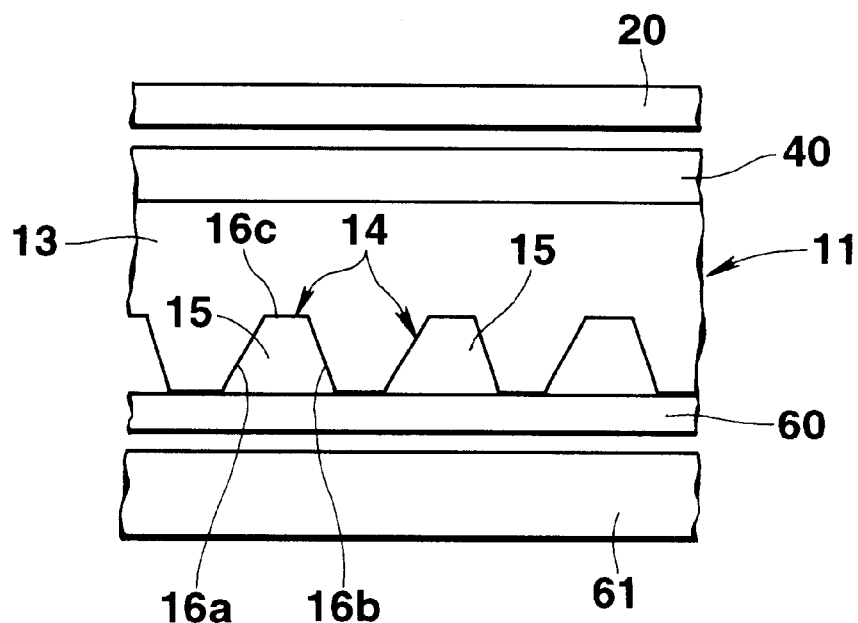
FIG. 18 is a cross-sectional view of the display apparatus according to a seventh embodiment of the present invention.

In the display apparatus shown in FIG. 18 according to the seventh embodiment of the present invention, a semi-transmission plate 60 is used in place of the reflection surface 12 of the reflection plate 11 having directivity which is used in the third embodiment described previously, and a back light 61 is provide behind the plate 60. The other respects of the structure of the apparatus according to the seventh embodiment are the same as those of the third embodiment.

The back light 61 is, for example, of a side light type comprising a light guide plate which takes in light from end surfaces and emits the light to the front side, and a light source is provided to be opposed to the end surface of the light guide plate.

According to the display apparatus of this embodiment, it is possible to achieve so-called two-way display as follows. When external light can be obtained with sufficient brightness, the external light which enters from the front side of the screen is reflected to perform reflection type display utilizing external light. When external light with sufficient brightness cannot be obtained, the back light 61 is lightened to perform transmission type display utilizing the light from the back light 61.

[Eighth Embodiment]

Figure 19:
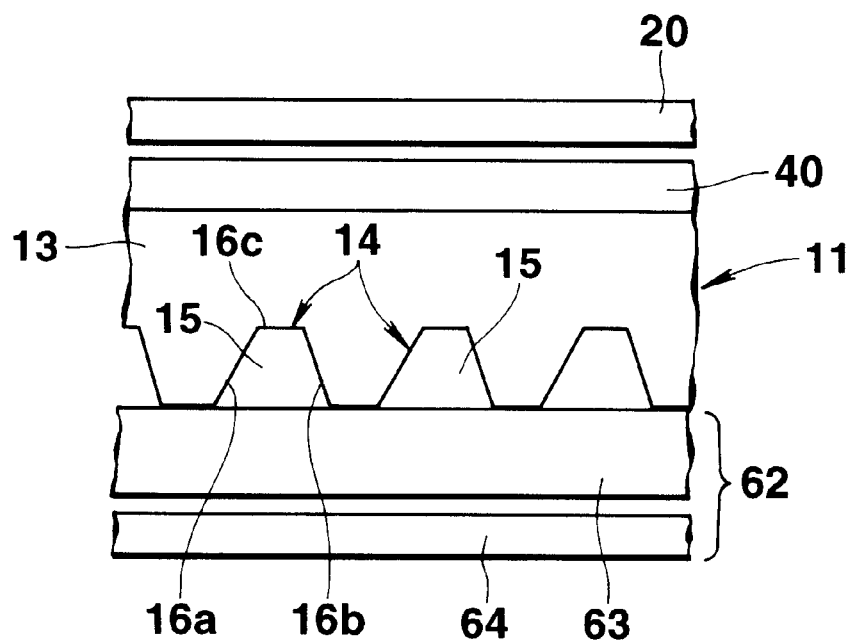
FIG. 19 is a cross-sectional view of a display apparatus according to an eighth embodiment of the present invention.

In the display apparatus shown in FIG. 19 according to the eighth embodiment of the present invention, a reflection member 62 serving also as a back light, which comprises a light emission element 63 having a light-transmission characteristic and a reflection plate 64 provided behind the light emission element, is used in place of the reflection surface 12 of the reflection plate 11 having directivity which is used in the third embodiment described previously. The other respects of the structure of the apparatus are the same as those of the third embodiment.

The light emission element 63 is, for example, an organic EL panel. The light emission element 63 made of the organic EL panel has a light transmission characteristic like a transparent plate when it is not lightened. Therefore, when the light emission element 63 is not lightened, the light entering from the front side of the screen is transmitted through the light emission element 63 and is reflected toward the front surface direction by the reflection plate 64 provided behind the element 63. When the light emission element 63 is lightened, the light emitted from this element 63 is emitted in the front surface direction directly or after being reflected by the reflection plate 64.

According to the display apparatus of this embodiment, it is possible to achieve so-called two-way display as follows. When external light can be obtained with sufficient brightness, the external light which enters from the front side of the screen is reflected to perform reflection type display utilizing external light. When external light cannot be obtained with sufficient brightness, the light emission element 63 is lightened to perform transmission type display utilizing the light from the light emission element 63.

[Ninth Embodiment]

Figure 20:
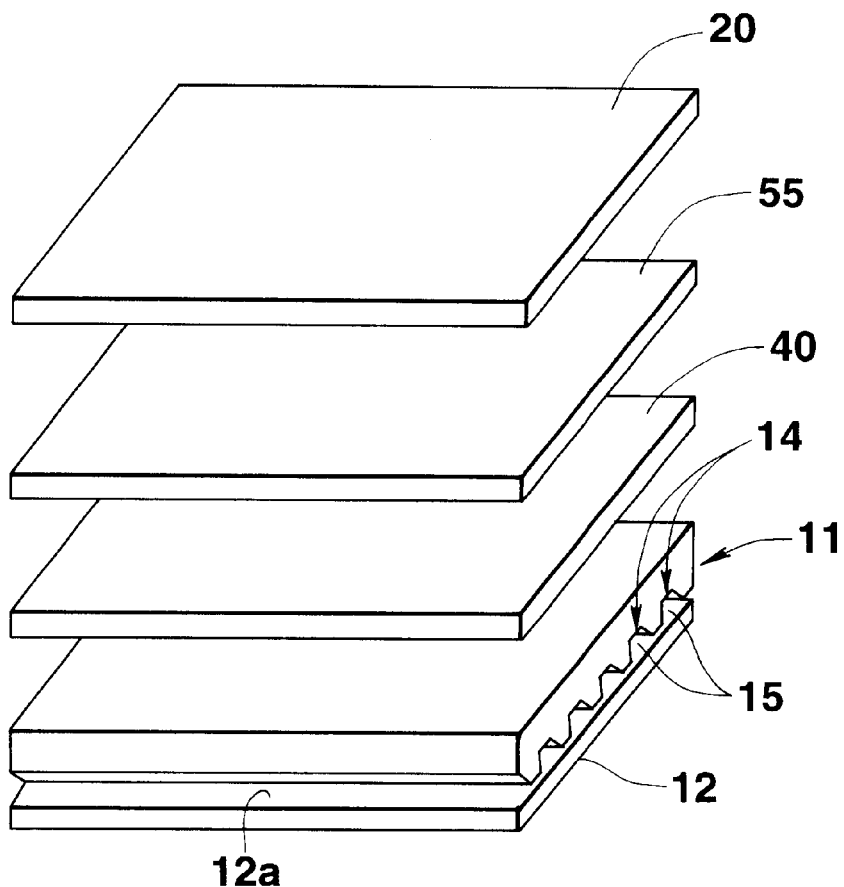
FIG. 20 is an exploded perspective sectional view of the display apparatus according to a ninth, embodiment of the present invention.
Figure 21:
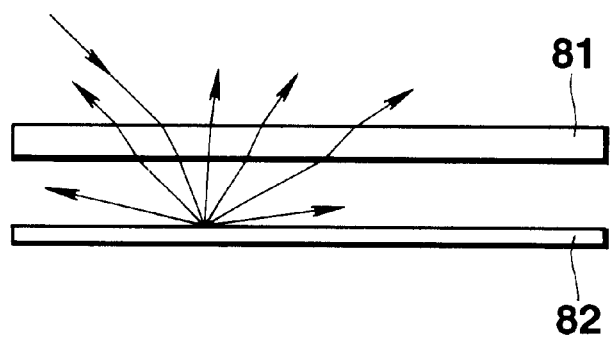
FIG. 21 is a cross-sectional view of a conventional display apparatus in which a display panel and a diffusion reflection plate are combined according to the prior art.

The ninth embodiment of the present invention shown in FIG. 20 is applied mainly to the case where the display panel 20 comprises a polarization plate such as a liquid crystal display panel of TN system, STN system, ECB system, or the like.

In this display apparatus, a polarization control plate 55 is provided between the display panel 20 and an incidence angle selective diffusion plate 40. The polarization control plate 55 has a characteristic that the most of light emitted from the incidence angle selective diffusion plate 40 is let enter into the display panel 20, as light of polarization components extending along the transmission axis of a polarization plate (not shown) on the back surface of the display panel 20. The other respects of the structure of this apparatus are the same as those of the third embodiment.

In the polarization control plate 55, for example, one of S-polarization light as light of a polarization component extending along one direction and P-polarization light as light of a polarization component extending along another direction perpendicular to the direction described above is transmitted as kept polarized, and the other one of the S-polarization light and P-polarization light is rotatory-polarized substantially by 90°.

According to the display apparatus of this ninth embodiment, most of the light which is reflected by the reflection plate 11 having directivity, passes through the incidence angle selective diffusion plate 40, and enters into the display panel 20 becomes light of polarization components along the transmission axis of the polarization plate on the back surface of the display panel and enters into the display panel 20, by means of the polarization control plate 55. Therefore, the light amount absorbed by the polarization plate is extremely reduced so that much brighter display can be obtained.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A reflection plate having directivity, comprising:
a reflection film including a flat reflection surface; and
an optical film arranged on a side of the reflection film onto which external light is incident, said optical film including: (i) a plurality of first optical surfaces inclined in a first direction with respect to a normal line of the flat reflection surface, for performing one of functions of reflecting and refracting light entering thereinto, (ii) a plurality of second optical surfaces inclined in a second direction opposite to the first direction also for performing one of functions of reflecting and refracting light entering thereinto, and (iii) a front surface into which external light enters and from which light reflected from the flat reflection surface and at least one of reflection light and refracted light from the first and second optical surfaces are emitted.

2. A reflection plate according to claim 1, wherein the front surface of the optical film is arranged to be substantially parallel to the flat reflection surface of the reflection film.

3. A reflection plate according to claim 1, wherein the first and second optical surfaces are respectively arranged at inclination angles different from each other with respect to the normal line of the flat reflection surface of the reflection film.

4. A reflection plate according to claim 1, wherein the first and second optical surfaces cross each other, and grooves each having a triangular cross-section are defined by the first and second optical surfaces, on a side of the optical film.

5. A reflection plate according to claim 4, wherein a substance having a lower refraction ratio than the optical film is provided in the grooves having the triangular cross-section.

6. A reflection plate according to claim 1, wherein the optical film comprises a plurality of third optical surfaces that cross the first and second optical surfaces and that transmit light reflected by the flat reflection surface of the reflection film.

7. A reflection plate according to claim 6, wherein the third optical surfaces are arranged to be substantially parallel to the flat reflection surface of the reflection film.

8. A reflection plate according to claim 6, wherein respective grooves having a substantially trapezoidal cross-section are defined by the first to third optical surfaces in the optical film.

9. A reflection plate according to claim 8, wherein a substance having a lower refraction ratio than the optical film is provided in the grooves having the substantially trapezoidal cross-section.

10. A reflection plate having directivity, comprising:
a reflection film including a flat reflection surface; and
an optical film including: (i) a plurality of first optical surfaces provided on a side of the flat reflection surface and inclined in a first direction with respect to a normal line of the flat reflection surface, for performing one of functions of reflecting and refracting light entering thereinto, (ii) a plurality of second optical surfaces inclined in a second direction opposite to the first direction thereby to perform one of functions of reflecting and refracting light entering thereinto, and (iii) a front surface into which external light enters and from which light reflected from the flat reflection surface and at least one of reflection light and refracted light from the first and second optical surfaces are emitted;
wherein the first and second optical surfaces cross each other, and grooves each having a triangular cross-section are defined by the first and second optical surfaces, on a side of the optical film.

11. A reflection plate having directivity, comprising:
a reflection film including a flat reflection surface; and
an optical film including: (i) a plurality of first optical surfaces provided on a side of the flat reflection surface and inclined in a first direction with respect to a normal line of the flat reflection surface, for performing one of functions of reflecting and refracting light entering thereinto, (ii) a plurality of second optical surfaces inclined in a second direction opposite to the first direction thereby to perform one of functions of reflecting and refracting light entering thereinto, and (iii) a front surface into which external light enters and from which light reflected from the flat reflection surface and at least one of reflection light and refracted light from the first and second optical surfaces are emitted;

wherein the optical film comprises a plurality of third optical surfaces that cross the first and second optical surfaces and that transmit light reflected by the flat reflection surface of the reflection film.

* * * * *